(12) United States Patent
Mei et al.

(10) Patent No.: US 9,411,830 B2
(45) Date of Patent: Aug. 9, 2016

(54) INTERACTIVE MULTI-MODAL IMAGE SEARCH

(75) Inventors: Tao Mei, Beijing (CN); Jingdong Wang, Palo Alto, CA (US); Shipeng Li, Beijing (CN); Yang Wang, Hefei (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/393,791

(22) PCT Filed: Nov. 24, 2011

(86) PCT No.: PCT/CN2011/082865
§ 371 (c)(1),
(2), (4) Date: Mar. 1, 2012

(87) PCT Pub. No.: WO2013/075316
PCT Pub. Date: May 30, 2013

(65) Prior Publication Data
US 2014/0250120 A1   Sep. 4, 2014

(51) Int. Cl.
*G06F 17/30* (2006.01)
*G06F 3/0488* (2013.01)
*G06F 3/16* (2006.01)

(52) U.S. Cl.
CPC ........ *G06F 17/30277* (2013.01); *G06F 3/0488* (2013.01); *G06F 3/16* (2013.01); *G06F 17/30259* (2013.01)

(58) Field of Classification Search
CPC ... G06F 17/30277; G06F 3/0488; G06F 3/16; G06F 17/30259
USPC ......................................................... 707/736
See application file for complete search history.

(56) References Cited

U.S. PATENT DOCUMENTS 5,530,793 A * 6/1996 Watkins et al. ............... 358/1.18
5,579,471 A * 11/1996 Barber et al. .................. 715/700
(Continued)

FOREIGN PATENT DOCUMENTS

CN    101159064    4/2008
JP    2003196306   7/2003
(Continued)

OTHER PUBLICATIONS

Zha, Zheng-Jun, et al., "Visual Query Suggestion: Towards Capturing User Intent in Internet Image Search", ACM Transactions on Multimedia Computing, vol. 6, No. 3, Article 13, Aug. 2010, pp. 13:1-13:19.*

(Continued)

*Primary Examiner* — Robert Stevens
(74) *Attorney, Agent, or Firm* — Sandy Swain; Micky Minhas; Lee & Hayes, PLLC

(57) ABSTRACT

A facility for visual search on a mobile device takes advantage of multi-modal and multi-touch input on the mobile device. By extracting lexical entities from a spoken search query and matching the lexical entities to image tags, the facility provides candidate images for each entity. Selected ones of the candidate images are used to construct a composite visual query image on a query canvas. The relative size and position of the selected candidate images in the composite visual query image, which need not be an existing image, contribute to a definition of a context of the composite visual query image being submitted for context-aware visual search.

20 Claims, 9 Drawing Sheets

(56) References Cited

U.S. PATENT DOCUMENTS

| | | | | |
|---|---|---|---|---|
| 5,790,132 | A * | 8/1998 | Watson | 345/441 |
| 5,913,205 | A * | 6/1999 | Jain et al. | |
| 5,915,250 | A * | 6/1999 | Jain et al. | |
| 5,963,670 | A * | 10/1999 | Lipson et al. | 382/224 |
| 6,075,905 | A * | 6/2000 | Herman et al. | 382/284 |
| 6,115,717 | A * | 9/2000 | Mehrotra et al. | |
| 6,915,301 | B2 * | 7/2005 | Hirsch | 717/100 |
| 7,032,179 | B2 * | 4/2006 | Mack et al. | 715/762 |
| 7,236,647 | B2 * | 6/2007 | Lunetta et al. | 382/284 |
| 7,400,761 | B2 | 7/2008 | Ma et al. | |
| 7,457,825 | B2 | 11/2008 | Li et al. | |
| 7,532,771 | B2 * | 5/2009 | Taylor et al. | 382/284 |
| 7,576,755 | B2 * | 8/2009 | Sun et al. | 345/629 |
| 7,653,261 | B2 * | 1/2010 | Blake et al. | 382/284 |
| 7,750,926 | B2 * | 7/2010 | Lonsing | 345/633 |
| 7,853,582 | B2 | 12/2010 | Gopalakrishnan | |
| 7,873,946 | B2 * | 1/2011 | Lathrop et al. | 717/125 |
| 8,068,693 | B2 * | 11/2011 | Sorek et al. | 382/284 |
| 8,380,516 | B2 * | 2/2013 | Jaramillo et al. | 704/270.1 |
| 2001/0031102 | A1 * | 10/2001 | Lunetta et al. | 382/284 |
| 2005/0004911 | A1 * | 1/2005 | Goldberg | G06F 17/30398 |
| 2005/0108282 | A1 | 5/2005 | Venkatachalam | |
| 2005/0187911 | A1 * | 8/2005 | Tunning | G06F 17/30976 |
| 2007/0005571 | A1 * | 1/2007 | Brewer | G06F 17/30277 |
| 2007/0260582 | A1 * | 11/2007 | Liang | G06F 17/30392 |
| 2007/0260972 | A1 | 11/2007 | Anderl | |
| 2008/0095470 | A1 * | 4/2008 | Chao et al. | 382/298 |
| 2008/0215548 | A1 * | 9/2008 | Ohashi | G06K 9/00664 |
| 2009/0006345 | A1 | 1/2009 | Platt et al. | |
| 2009/0024591 | A1 * | 1/2009 | Miyasaka | G06F 17/30244 |
| 2009/0070321 | A1 | 3/2009 | Apartsin et al. | |
| 2009/0287680 | A1 | 11/2009 | Paek et al. | |
| 2009/0287681 | A1 * | 11/2009 | Paek et al. | 707/5 |
| 2009/0327236 | A1 * | 12/2009 | Denney | G06F 17/3064 |
| 2010/0145956 | A1 * | 6/2010 | Shi | G06F 17/30864 707/754 |
| 2010/0309226 | A1 * | 12/2010 | Quack et al. | 345/634 |
| 2011/0022634 | A1 * | 1/2011 | Takata | G06T 3/4007 707/776 |
| 2011/0035406 | A1 * | 2/2011 | Petrou | G06F 17/3005 707/769 |
| 2011/0055203 | A1 * | 3/2011 | Gutt | G06F 17/30533 707/722 |
| 2011/0072048 | A1 | 3/2011 | Hua et al. | |
| 2011/0078055 | A1 * | 3/2011 | Faribault | G06Q 30/02 705/27.2 |
| 2011/0106845 | A1 * | 5/2011 | Lipson et al. | 707/769 |
| 2011/0196864 | A1 * | 8/2011 | Mason | G06F 3/0416 707/728 |
| 2012/0257842 | A1 * | 10/2012 | Tian et al. | 382/294 |
| 2013/0114900 | A1 * | 5/2013 | Vedantham et al. | 382/182 |
| 2013/0254191 | A1 * | 9/2013 | He et al. | 707/749 |
| 2013/0288702 | A1 * | 10/2013 | Abu-Alqumsan et al. | 455/456.1 |
| 2013/0297591 | A1 * | 11/2013 | Seefeld et al. | 707/722 |
| 2014/0222783 | A1 * | 8/2014 | Chang et al. | 707/722 |

FOREIGN PATENT DOCUMENTS

| | | |
|---|---|---|
| JP | 2006050469 | 2/2006 |
| JP | 2007122694 | 5/2007 |
| JP | 2009105769 | 5/2009 |

OTHER PUBLICATIONS

Zha, Zheng-Jun, et al., "Visual Query Suggestion", MM '09, Beijing, China, Oct. 19-24, 2009, pp. 15-24.*

Zha, Zheng-Jun, et al., "Joint Multi-Label Multi-Instance Learning for Image Classification", CVPR 2008, Anchorage, AK, Jun. 23-28, 2008, pp. 1-8.*

Kennedy, Lyndon S., et al., "Automatic Discovery of Query-Class-Dependent Models for Multimodal Search", MM '05, Singapore, Nov. 6-11, 2005, pp. 882-891.*

Haubold, Alexander, et al., "Semantic Multimedia Retrieval Using Lexical Query Expansion and Model-Based Reranking", ICME 2006, Toronto, Ontario, Canada, Jul. 9-12, 2006, pp. 1761-1764.*

Jing, Feng, et al., "Learning in Region-Based Image Retrieval", CIVR 2003, LNCS 2728, Springer-Verlag, Berlin, Germany, © 2003, pp. 206-215.*

Oria, Vincent, et al., "Foundation of the DISIMA Image Query Languages", Multimedia Tools and Applications, vol. 23, Kluwer Academic Publishers, The Netherlands, © 2004, pp. 185-201.*

Mei, Tao, et al., "Video collage: presenting a video sequence using a single image", The Visual Computer, vol. 25, Issue 1, Springer, Jan. 2009, pp. 39-51.*

Li, Teng, et al., "Contextual Bag-of-Words for Visual Categorization", IEEE Transactions on Circuits and Systems for Video Technology, vol. 21, No. 4, IEEE, Apr. 2011, pp. 381-392.*

Wang, Yong, et al., "Combining global, regional and contextual features for automatic image annotation", Pattern Recognition, vol. 42, Issue 2, Elsevier Ltd., Feb. 2009, pp. 259-266.*

Wang, Yang, et al., "JIGSAW: Interactive Mobile Visual Search with Multimodal Queries", MM '11, Scottsdale, AZ, Nov. 28-Dec. 1, 2011, pp. 73-82.*

Agarwala, Aseem, et al., "Interactive Digital Photomontage", SIGGRAPH '04, Los Angeles, CA, Aug. 8-12, 2004, pp. 294-302.*

Rother, Carsten, et al., "AutoCollage", SIGGRAPH '06, Boston, MA, Jul. 30-Aug. 3, 2006, pp. 847-852.*

Diakopoulos, Nicholas, et al., "Mediating Photo Collage Authoring", UIST '05, Seattle, WA, Oct. 23-27, 2005, pp. 183-186.*

Wang, Changhu, et al., "MathFinder: Image Search by Interactive Sketching and Tagging", WWW 2010, Raleigh, NC, Apr. 26-30, 2010, pp. 1309-1312.*

Chen, Tao, et al., "Sketch2Photo: Internet Image Montage", ACM Transactions on Graphics, vol. 28, No. 5, Article 124, ACM, Dec. 2009, 10 pages.*

Etiz, Mathias, et al., "PhotoSketch: A Sketch Based Image Query and Compositing System", SIGGRAPH 2009, New Orleans, LS, Aug. 3-7, 2009, Article 60, 1 page*

Wang, Xin-Jing, et al., "Annotating Images by Mining Image Search Results", IEEE Transactions on Pattern Analysis and Machine Intelligence, vol. 30, No. 11, Nov. 2008, pp. 1919-1932.*

Smith, John R., et al., "VisualSEEk: a fully automated content-based image query system", ACM Multimedia 96, Boston, MA, © 1996, pp. 87-98.*

Etiz, Mathias, et al., "An evaluation of descriptors for large-scale image retrieval from sketched feature lines", Computer & Graphics, vol. 34, © 2010, pp. 482-498.*

Cao, Yang, et al., "MathFinder: Interactive Sketch-based Image Search on Millions of Images", MM '10, Firenze, Italy, Oct. 25-29, 2010, pp. 1605-1608.*

Etiz, Mathias, et al., "Photosketcher: Interactive Sketch-Based Image Synthesis", IEEE Computer Graphics and Applications, vol. 31, Issue 6, date of publication: Jul. 21, 2011, pp. 56-66.*

Etiz, Mathias, et al., "Sketch Based Image Deformation", VMV 2007, © 2007, pp. 135-142.*

Communications Review Journal, vol. 15, No. 3, 2010, 48 pages, retrieved from <<http://www.pwc.com/en_GX/gx/communications/pdf/communications-review-value-vol15-no3.pdf>> on Mar. 21, 2012.

Rabiner, A tutorial on hidden markov models and selected applications in speech recognition. Proceedings of the IEEE, 77(2):257-286, 1989, <<http://www.cacs.ull.edu/~logan/cmps598/rabiner.pdf>>.

Porter, An algorithm for suffix stripping. Program: electronic library and information systems, 14(3):130-137, 1993, <<http://www.mis.yuntech.edu.tw/~huangcm/research/porter.pdf>>.

Caltech-256 Object Category Dataset, <<http://authors.library.caltech.edu/7694/1/CNS-TR-2007-001.pdf>>, 20 pages.

Chandrasekhar, et al., CHoG: Compressed Histogram of Gradients—A Low Bit-rate Feature Descriptor, Proc. of CVPR, pp. 2504-2511, 2009.

Frey, et al., Clustering by passing messages between data points. Science, 315(5814):972-976, 2007, <<http://www.utstat.toronto.edu/reid/sta414/frey-affinity.pdf>>.

Chandrasekhar, et al., Comparison of local feature descriptors for mobile visual search. In Proc. of ICIP, pp. 3885-3888. IEEE, 2010.

(56) References Cited

OTHER PUBLICATIONS

Digimac Discover, <<https://www.digimarc.com/discover/>>, retrieved on Sep. 23, 2011, 3 pages.

Lowe, Distinctive image features from scale-invariant keypoints. International journal of computer vision, 60(2):91-110, 2004., <<http://grvc.us.es/staff/ferruz/master_vision/correspondencia/lowe_scale_inv_04_IJCV.pdf>>.

Sekine, et al., Extended Named Entity Hierarchy. In Proceedings of the LREC 2002, 7 pages.

Flickr. <<http://www.flickr.net/>>, 2 pages, accessed on Sep. 29, 2011.

GazoPa, <<http://www.gazopa.com/>>, 1 page, retrieved Sep. 23, 2011.

Google Goggles, <<http://www.google.com/mobile/goggles/>>, 1 page, retrieved on Sep. 23, 2011.

Yang, et al., Image Description and Matching Scheme for Identical Image Searching, Future Computing, Service Computation, Cognitive, Adaptive, Content, Patterns, Computation World, 669-674, 2009.

Datta, et al., Image Retrieval: Ideas, Influences, and Trends of the New Age, ACM Computing Surveys, 40(65), 2008, <<http://maaz.ihmc.us/rid=1228291028147_214431826_7165/Image%20Retrieval.pdf>>, 60 pages.

Xu, et al., Image Search by Concept Map, In Proceeding of SIGIR, pp. 275-282. ACM, 2010.

Deng, et al., ImageNet: A Large-scale Hierarchical Image Database, 2009, <<http://www.image-net.org/papers/imagenet_cvpr09.pdf>>, 8 pages.

Wang, et al., Interactive Image Search by Color Map, ACM Transactions on Intelligent Systems and Technology, vol. 2, No. 3, Oct. 2010, pp. 1-26.

Fei-Fei, et al., Learning Generative Visual Models from Few Training Examples: An Incremental Bayesian Approach Tested on 101 Object Categories, Computer Vision and Image Understanding, 106(1):59-70, 2007, <<http://bccn2009.org/~triesch/courses/260object/papers/Fei-Fei_GMBV04.pdf>>.

Chandrasekhar, et al., Low latency image retrieval with progressive transmission of CHoG descriptors. In Proceedings of ACM Multimedia Workshop on Mobile Cloud Media Computing, pp. 41-46. ACM, 2010.

Cao, et al., MindFinder: Interactive Sketch-based Image Search on Millions of Images, In Proceedings of the international conference on Multimedia, pp. 1605-1608. ACM, 2010.

Church, et al., Mobile Information Access: A Study of Emerging Search Behavior on the Mobile Internet, ACM Transactions on the Web, 1(1), May 2007, <<http://cis.csuohio.edu/~arndt/krupp.ppt>>, 25 pages.

Zhang, et al., Multimodal Image Retrieval via Bayesian Information Fusion, IEEE International Conference on Multimedia and Expo, 2009, pp. 830-833.

Anguera, et al., Multimodal Photo Annotation and Retrieval on a Mobile Phone, MIR 2008, Proceedings of the 1st ACM International Conference on Multimedia Information Retrieval, pp. 188-194, Oct. 2008.

Nokia Point and Find, <<http://pointandfind.nokia.com/>> & <<http://pointandfind.nokia.com/main_publisher>>, retrieved on Sep. 23, 2011, 1 page.

Takacs, et al., Outdoors Augmented Reality on Mobile Phone Using Loxel-based Visual Feature Organization, In Proc. of ACM International Conference on Multimedia Information Retrieval, pp. 427-434, 2008.

Jia, et al., Photo-to-Search: Using camera phones to inquiry of the surronding world, In Proc. of Mobile Data Magagement, 2006, 4 pages.

Nister, et al., Scalable recognition with a vocabulary tree. In Proc. of IEEE International Conference on Computer Vision and Pattern Recognition, pp. 2161-2168, 2006.

SnapNow, <<http://www.snapnow.co.uk/>>, 1 page, retrieved on Sep. 23, 2011.

SnapTell <<http://www.snaptell.com/>>, 1 page, accessed Sep. 23, 2011.

Bay, et al., SURF: speeded-up robust features, In Proc. of ECCV, pp. 346-359, 2008.

Li, Understanding the semantic structure of noun phrase queries. In Proceedings of the 48th Annual Meeting of the Association for Computational Linguistics, pp. 1337-1345, 2010.

Hua, et al., What can visual content analysis do for text based image search? In Proceedings of IEEE International Conference on Multimedia and Expo, pp. 1480-1483, 2009.

Miller, WordNet: a lexical database for English. Communications of the ACM, 38(11):39-41, 1995, <<http://www.cparity.com/projects/AcmClassification/samples/219748.pdf>>.

Xcavator, <<http://www.xcavator.net/>>, 3 pages, accessed in Sep. 29, 2011.

"Kooaba—Image Recognition", retrieved on Nov. 25, 2014 at <<http://www.kooaba.com>>, 3 pages.

Supplementary European Search Report mailed Jul. 14, 2015 for European patent application No. 11876320.0, 3 pages.

European Office Action mailed Sep. 14, 2015 for European patent application No. 11876320.0, a counterpart foreign application of U.S. Appl. No. 13/393,791, 5 pages.

Translated Japanese Office Action mailed Oct. 27, 2015 for Japanese patent application No. 2014-542660, a counterpart foreign application of U.S. Appl. No. 13/393,791, 6 pages.

Chinese Office Action mailed Jun. 28, 2016 for Chinese patent application No. 201180075049.8, a counterpart foreign application of U.S. Appl. No. 13/393,791, 13 pages.

Japanese Office Action mailed Jun. 28, 2016 for Japanese Patent Application No. 2014-542660, a counterpart foreign application of U.S. Appl. No. 13/393,791, 3 pages.

\* cited by examiner

INTERACTIVE MULTI-MODAL IMAGE SEARCH

PRIORITY APPLICATION

This Application is a 35 U.S.C. 371 National Stage Entry of and claims priority to PCT Application Serial No. PCT/CN2011/082865, entitled "Interactive Multi-Modal Image Search," filed on Nov. 24, 2011, which is fully incorporated by reference herein.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2011, Microsoft Corp.

BACKGROUND

Mobile devices with access to the Internet and the World Wide Web have become increasingly common, serving as personal Internet-surfing concierges that provide users with access to ever increasing amounts of data while on the go.

Some search applications for mobile devices support photographs taken with a camera built into the mobile device as a visual query, which is called capture-to-search. In capture-to-search, typically a picture is first snapped, then that snapshot is submitted as the query to search for a match in various vertical domains. Existing search engines have limited ability to handle a long query very well because of the gap in machine learning of semantic meaning of a long sentence. For example, a textual query like "find an image with several green trees in front of a white house" may not result in any relevant search results.

Some search engines for the desktop use a user submitted sketch for searching, employ various filters, e.g., "similar images," color, style, or face as indications of search intent, or support the uploading of an existing image as a query for search, akin to the capture-to-search mode discussed above. One search program allows a user to emphasize certain regions on the query image as key search components, while another uses the position and size of a group of tags to filter the top text-based search results, while still another uses a selection of multiple color hints on a composite canvas as a visual query. However, user interaction for a desktop differs from that on a mobile device.

Mobile devices do not currently provide a platform that is conducive for some types of searching, in particular searching images or video without capturing a photograph of the search subject. In addition, text input or voice input are not well suited to visual search. For example, typing on a phone is often tedious while a spoken query is unsuited to expressing visual intent. Moreover, ascertaining user intent in the visual search process is somewhat complex and may not be well expressed by a piece of text (or voice transcribed to text).

SUMMARY

This document describes a facility for visual search on a mobile device that takes advantage of multi-modal input including touch input on the mobile device. By extracting lexical entities from a search query, including a spoken search query, and by matching the lexical entities to image tags, the facility provides candidate images for each entity. The facility provides for selection of particular candidate images. The facility uses the selected candidate images, including their size and position to construct a composite visual query on a query canvas. The composite visual query need not be an existing image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The terms "techniques" or "facility," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
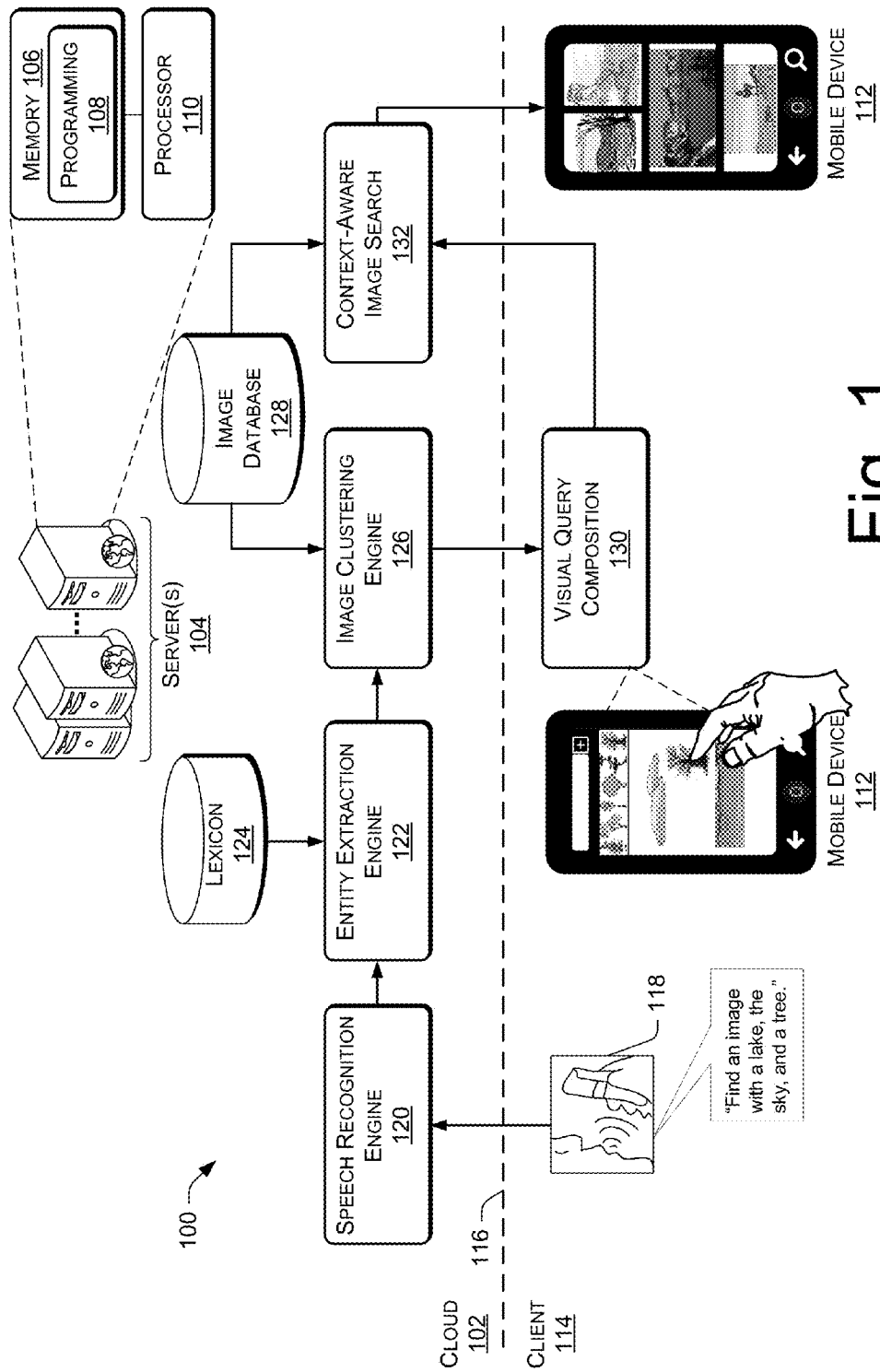
FIG. 1 is a pictorial diagram of an example framework implementing an interactive multi-modal image search with a mobile device.

A mobile interactive multi-modal image search tool provides a rich set of functionalities to obtain relevant results for visual search. Compared to a desktop computer, which predominantly supports text-to-search, a mobile device provides a more rich set of interfaces for user interaction that can be employed to ease use and obtain more relevant results. For example, beyond traditional keyboard and mouse inputs received in the desktop environment, mobile devices are enabled to receive additional multi-modal inputs. Mobile device interfaces can combine text input with visual modality via a built-in camera and voice modality via speech recognition in addition to a touch screen interface, which in some cases accepts multi-touch input. A multi-touch enabled interface recognizes multiple simultaneous touch inputs.

One of the challenges faced by visual search is that search intent can be implicit. Search intent being implicit means that a user may not be in surroundings that correspond to a particular visual search intent such that capture-to search is feasible, but the user can express search intent through other modalities such as in a voice description or textual input.

For example, a user may be looking for a restaurant with a red door and two stone lions in the front. However, the user may not remember the name of the restaurant to undertake a search on that basis. In this example, a client-side tool that can transfer a long textual or audio, e.g., spoken query, into a visual query and leverage user interaction, as provided by the mobile interactive multi-modal image search tool as described herein, can be used to identify the restaurant and to determine the name of the restaurant as well as its location. As another example, the user may be visiting a city and may remember that a restaurant (or restaurant chain) has a location in that particular city without remembering the location, so the user may include the city as part of the spoken query.

The mobile interactive multi-modal image search tool leverages multi-modal interactions including touch and multi-touch interactions to help determine implicit search intent and improve the performance of visual search including when a query image is not initially available. The search procedure described herein includes the following phases: 1) receiving an initial input, for example, an audio input such as a spoken natural sentence as the query to the mobile device, 2) using speech recognition to transfer the audio input to text, 3) decomposing the text into keywords by entity extraction, 4) identifying candidate images according to the extracted entities by an image clustering process, 5) receiving selection of particular candidate images that can visually represent each entity, 6) receiving refinement of the selected particular candidate images relative to one another to compose a query image, and 7) using the composed query image as a visual query to search for similar images.

The mobile interactive multi-modal image search tool described herein provides a context-aware approach to image search that takes into consideration the spatial relationship among separate images, which are treated as image patches, e.g., small sub-images that represent visual words. The mobile interactive multi-modal image search tool presents an interface for a new search mode that enables users to formulate a composite query image by selecting particular candidate images, manipulating the selected candidate images including resizing and maneuvering them relative to each other, and putting these manipulated images together like pieces of a jigsaw puzzle to create a composite query image on an interactive canvas.

Example Framework

FIG. 1 shows a framework 100 for interactive mobile image search as described herein. Example framework 100 is illustrated with a cloud side 102 hosted by a least one server 104. Server 104 includes a memory 106, storing programming 108, and a processor 110. One or more mobile devices 112 from client side 114 can connect to server 104 and other cloud-based devices via a network 116, which is represented by a dashed line. Servers 104 may include, for example, a web server, an application server, and any number of other data servers. Network 116 is representative of any type of communication network including, for example, the Internet. Mobile device 112 is representative of any type of mobile device configured to transmit and receive data over network 116. For example, mobile device 112 may be implemented as a mobile phone, a personal digital assistant (PDA), a netbook, a tablet computer, a handheld computer, and other such mobile computing devices characterized by reduced form factor and resource limitations.

The framework 100 employs multi-modal interactivity to recognize search intent from a mobile device 112 and can combine different visual descriptors (e.g., Scale-Invariant Feature Transform (SIFT), color, and edge) for visual search. Although certain operations are illustrated as occurring in the cloud 102 of FIG. 1, in various implementations one or more of these operations can occur on mobile device 112.

In the illustrated example, mobile device 112 receives a natural sentence input via a microphone and voice processor to initiate a voice query, as shown at 118. For example, a mobile device 112 receives a sentence like "find an image with a lake, the sky, and a tree," as illustrated at 118. The system employs a speech recognition (SR) engine 120 to transfer the speech received at 118 to a piece of text. The system then employs entity extraction engine 122 to extract entities, which are nouns, from the text. As a result, the tool recognizes "lake," "sky," and "tree" as three entities from lexicon 124. An image clustering engine 126 identifies candidate images from an image database 128 that correspond to each of the three entities and that can be used as respective image patches to represent the recognized entities.

Directly using the extracted entities as textual queries for image search may not return relevant results because searching text surrounding matching image tags only addresses each entity separately rather than as a group. In addition, it does not provide a facility to account for position and/or size of images representing the extracted entities relative one to another. Therefore, the interactive multi-modal image search tool presents a predefined number of candidate images so that a particular image for each entity can be selected and a composite visual query can be composed from the selected images as shown at 130.

The interactive multi-modal image search tool exploits the composite visual query to search for relevant images from image database 128 or in some instances from other sources such as the Internet. The interactive multi-modal image search tool conducts a context-aware image search based on the relative position and the size of the selected images and their respective visual content as shown at 132. Responsive to the context-aware image search, the interactive multi-modal image search tool causes visual results to be returned to mobile device 112.

Example User Interface

Figure 2:
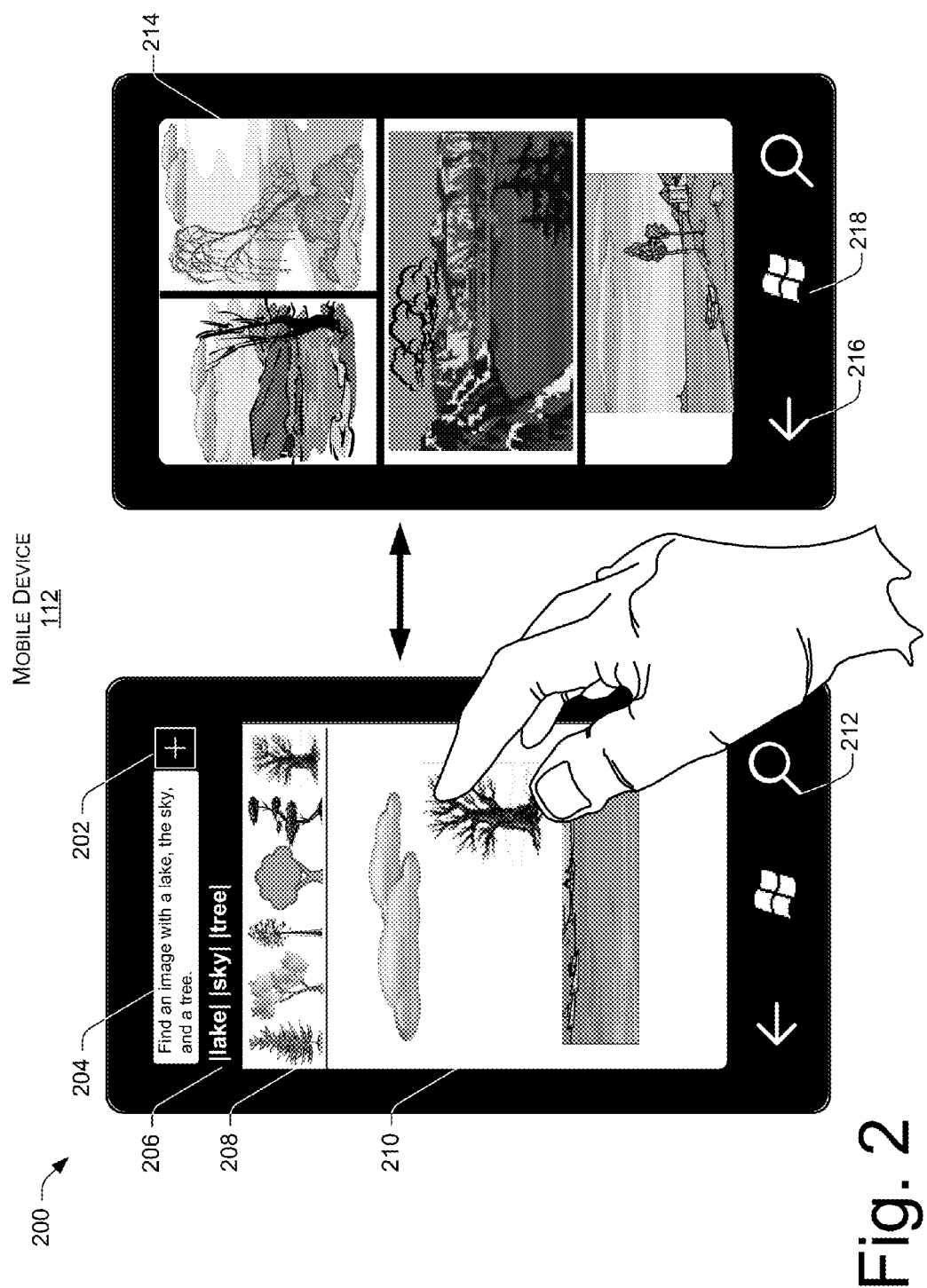
FIG. 2 is a pictorial diagram of an example user interface of interactive multi-modal image search on a mobile device.

FIG. 2, at 200, illustrates an example of user interface components for use in interactive multi-modal image search on mobile device 112. In the illustrated example, mobile device 112 represents a Windows Phone® device, although other mobile phones, smart phones, tablet computers, and other such mobile devices may similarly be employed. On mobile device 112, activation of a hard or soft button 202, indicates a desire to initiate audio input. As described above, the audio input is received and converted to text, such as via speech recognition engine 120. The converted text can be presented on the screen of mobile device 112 as shown at 204, which allows for editing in the event parts of the text are misconverted. In some alternate instances, rather than initial audio input, text input may be received via hard or soft keys on mobile device 112 to initiate the interactive multi-modal image search.

Accordingly, in various implementations the interactive multi-modal image search tool leverages voice input to help users initiate a query by employing a SR engine that is able to accept natural sentences and phrase fragments, and then transcribe the speech into text, such as a Hidden Markov Model (HMM)-based SR engine.

The example SR engine 120 uses a statistical modeling framework, in which the received utterance is first transformed into a compact and meaningful representation (vector) in the feature space. A decoder of the example SR engine 120 takes the feature vectors as input and generates a probability for a hypothesized word sequence based on acoustic and language models.

The output from the example SR engine 120 can be used as a query for an image search. The interactive multi-modal image search tool processes the output from the SR engine 120 to extract entities, which are noun keywords like "tree," "lake," "car," and "house." Entity extraction engine 122 may detect words that can be represented by several candidate images. When multiple candidate images are identified, particular images of the candidate images can be selected for refinement to show search intent. Therefore, the tool detects visually meaningful noun words/phrases as entities such as "house," "lake," and "tree," while discarding non-visually descriptive nouns like "law" and "holiday." In some implementations a city name detected as an entity can be treated as a non-visually descriptive noun. In several such instances the city name is discarded, in others the city name is retained for later use as a separate category of noun.

To this end, the interactive multi-modal image search tool can construct an entity dictionary or lexicon such as lexicon 124 by collecting nouns that have concrete visual representations (e.g., collecting 117,798 nouns from 155,287 words). In an example implementation, the judgment of whether a noun has a concrete visual representation is based on whether the noun is included in any tags of images in image database 128, which is updated regularly. In at least one implementation, the interactive multi-modal image search tool omits nouns with less than a threshold number of images (e.g., 100) in the image database, causing a lesser number of unique words to be kept (e.g., keeping 22,117 unique words).

In addition, in at least one implementation, the interactive multi-modal image search tool includes other entities such as celebrity names, popular products, and landmarks to account for input such as "Superman" and "Eiffel." The interactive multi-modal image search tool can obtain these additional entities by mining the Internet and/or such additional entities can be based on queries from commercial search engines. In an example implementation, as a part of entity extraction performed by entity extraction engine 122, words in the spoken search query are assigned to their longest match from the lexicon 124. For example, "polar bear" and "Eiffel Tower" are phrases that provide known semantic meaning. Thus, they are extracted as phrase entities that are matched to phrases from the lexicon 124. Each extracted entity is used in its longest form independently in image clustering performed by image clustering engine 126. Thus, extracted phrase entities are used as phrases rather than individual nouns by image clustering engine 126. Accordingly, selected images, which later serve as image patches in composite visual queries for context-aware image search 132, may represent phrases rather than individual nouns.

In an example implementation, the extracted entities are presented as tags on the screen of mobile device 112 as shown at 206. Meanwhile, candidate images for the entities can be presented on the screen of mobile device 112 as shown at 208. In the example shown, candidate images for one entity, "tree," are presented in a single horizontal ribbon format, from which a particular image is being selected by dragging onto a canvas area 210 of the screen of mobile device 112. Meanwhile, particular candidate images for the entities "lake" and "sky" have already been selected via dragging onto a canvas area 210 of the screen of mobile device 112. However, other formats are both possible and contemplated. For example, candidate images for more than one entity may be presented simultaneously in vertical or horizontal ribbons on a portion of the screen for selection of a particular candidate image to represent each entity.

The canvas area 210 accepts manipulation of the selected images through touch, including multi-touch input, to resize and maneuver the images within the canvas area 210. In this way a composite query image for visual search is defined by the size and position of each image patch in the composite query image without requiring an existing query image. In the illustrated example, the interactive multi-modal image search tool records the location of the lake as being lower in the frame of the canvas area 210 than the tree and the sky. Meanwhile, the tree is recorded as being positioned to the right in the frame of canvas area 210 and below the sky, while the sky is at the top of the canvas area 210. In various implementations all or part of one or more of the selected images can overlay another of the selected images in forming the composite query image within the canvas area 210. When an image portion is obscured by overlay, the obscured portion may be discarded, or given a lower calculated weight and/or the portion being overlaid may be given a higher calculated weight. Based on the visual content of the selected particular candidate images, content for the respective entities include cumulous clouds in the sky, a tree without leaves, and a calm lake with some visible shoreline.

Activation of the search button 212 starts a context-aware visual search 132 based on the composite visual query image defined on the canvas area 210. In other implementations, a double tap or other input can start the context-aware visual search 132. In various implementations activation of the search button 212 also causes the tags associated with the selected images to be stored for later use by the interactive multi-modal image search tool.

As shown in the illustrated example at 214, mobile device 112 is configured to present results of the context-aware visual search 132 on the screen. Using touch input on the screen, the results can be scrolled, and through a tap or other such input, one of the results can be selected, for example, to retrieve additional information about the result image. Alternately, if none of the results meet the search intent, activation of the back button 216 will cause the screen to revert to the previous canvas so that the composite query image can be further manipulated. On the other hand, other functionality of the mobile device can be accessed by activating the start button 218.

Figure 3:
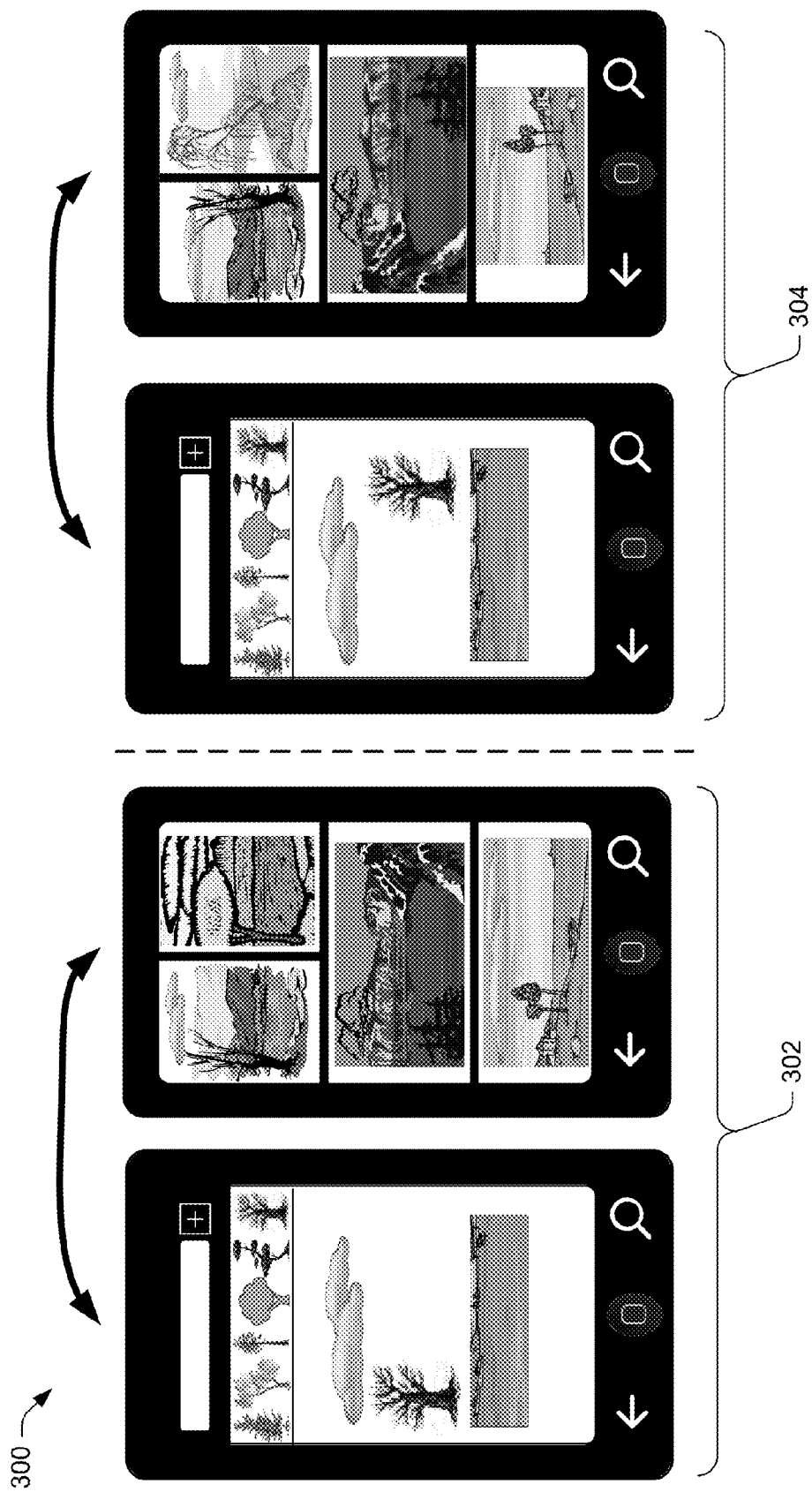
FIG. 3 is a pictorial diagram of an example user interface implementing interactive multi-modal image search from variations of a multi-modal query illustrating context-aware image search on a mobile device.

FIG. 3, at 300, illustrates two composite visual queries being composed from the same particular selected candidate images using the mobile interactive multi-modal image search tool. As shown in the illustrated examples, the selected images are treated as image patches whose relative placement and size contribute to the execution of a context-aware image search employing the composite image as a visual query. The composite visual query represented at 302, on the left of the dotted line, has been composed with a tree toward the left horizontally and in the middle of the canvas vertically. Meanwhile, the composite visual query represented at 304, on the right of the dotted line, has been composed with a tree toward the right horizontally and in the middle of the canvas vertically. In other examples, the size of the image patches may also be varied to obtain additional results. As demonstrated at 300, different placements of the same image patches, which would have the same stored tags, in two composite visual queries may result in different query results being returned.

As described above, the interactive multi-modal image search tool described herein takes advantage of the multimodal functionality of mobile devices, including touch screen interactions, to enable composition of a visual query. For each entity extracted from an initial input such as audio or textual input, the system returns a set of candidate images. Selection of a particular image per entity is recognized from the selected image being dragged onto a canvas where the composite visual query is formed. Formation of the composite visual query occurs through manipulation of each of the selected images to serve as image patches in the composite visual query. The manipulation, for example, can include adjusting the position and the size of each selected image on the canvas area 210 such as via touch and/or multi-touch input. Such multi-modal interaction addresses various ambiguities that occur in existing text-based image search systems, including, for example, polysemy, aspect, viewpoint, position, and attributes.

In the context of this disclosure, polysemy, aspect, viewpoint, position, and attributes have the following meanings: polysemy means that a word has multiple meanings, such as apple (fruit or product), football (European football or American football); aspect indicates that a word may represent different concepts, such as apple (company or product), football (object or game); viewpoint means an object could have various appearances from different angles or perspectives, such as a car (side or front view), or an office (inner or outer); position indicates an expected location of the object within the target image; and attribute defines the properties of an entity, such as color, type, and decoration. Each of these ambiguities may lead to difficulties in deriving visual search intent from audio or textual queries.

Figure 4:
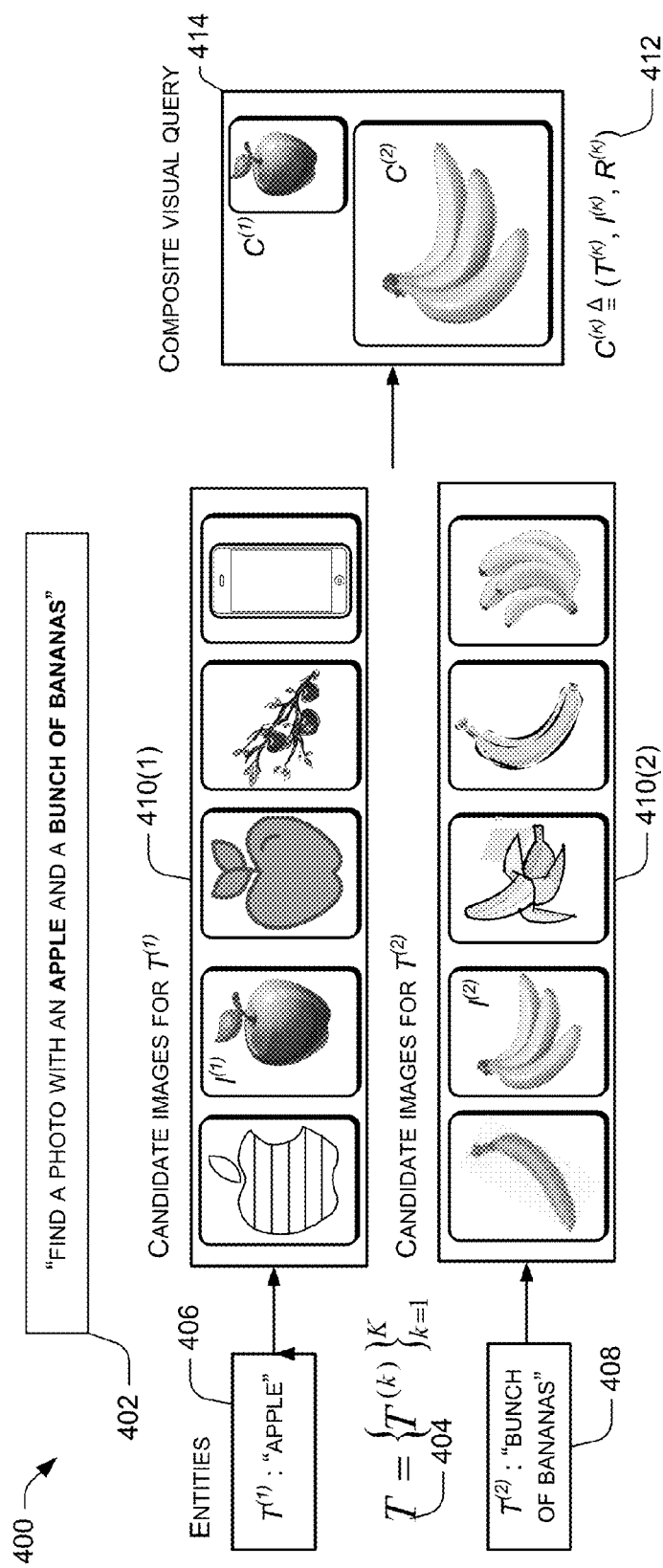
FIG. 4 is a pictorial diagram illustrating candidate images to represent entities for selection to manipulate and form a composite visual query.

Table 1 lists notations that may be employed to represent various image features, as illustrated in FIG. 4.

TABLE 1

| | |
|---|---|
| I | Selected image |
| J | Target image to be searched |
| R | Rectangle region for a component on the canvas of the composite visual query |
| T | Entity, e.g., keyword |
| C | $C \triangleq (T, I, R)$, component in a composite visual query |
| K | Number of entities |
| k | Index of components ($k = 1, \ldots, K$) |
| f | Feature vector of an image |
| g | Gaussian window |
| h | Feature vector of an image grid |
| $C^{(k)}$ | $C^{(k)} \triangleq (T^{(k)}, I^{(k)}, R^{(k)})$, the k-th component |
| $(i, j)$ | Index of a grid in the target image J |
| $R_J^{(k)}$ | $R_J^{(k)} \cup_{(i,j) \in R^{(k)}} (i, j)$, the union of the grids in J |
| $e_J^{(k)}(i, j)$ | Visual similarity between $I^{(k)}$ and image region $R_J^{(k)}$ |
| $d^{(k)}(i, j)$ | User intent map for the k-th component at $(i, j)$ |
| $r_J^{(k)}$ | Relevance between composite query and target image J in terms of k-th component |
| $r_J$ | Overall relevance between composite query and target image J |

As shown in FIG. 4, at 400, interactive composition of a visual query by manipulating multiple selected images on a composite canvas allows derivation of search intent. Specifically, from a voice query, "find a photo with an apple and a bunch of bananas," 402, the interactive multi-modal image search system will recognize a set of entities (keywords) $T = \{T^{(k)}\}_{k=1}^{K}$ 404, and return a list of candidate images for each entity. In various implementations the list of candidate images for each entity is stored for later use by the interactive multi-modal image search tool.

As shown in FIG. 4, $T^{(k)}$ indicates one entity and K is the number of entities in the textual query T. which in the illustrated example is two: $T^{(1)}$="apple," 406, and $T^{(2)}$="bunch of bananas," 408.

In an alternate implementation users may manually select candidate images from a large number of images (e.g., an image database or the top image search results from search engines). In another alternate implementation the images from databases may be used simply based on tags with accommodation for the cross-domain difference between databases and general web images.

In at least one implementation, the interactive multi-modal image search tool employs an automatic process to identify the candidate images for each entity. For example, the interactive multi-modal image search tool uses a clustering-based approach based on visual features and a similarity metric to identify candidate images for a given entity by exploiting a known image database and image search engines' results. FIG. 4 presents examples of candidate images for entities $T^{(1)}$ and $T^{(2)}$ in a ribbon format. A ribbon of candidate images for $T^{(1)}$ is illustrated at 410(1), and a ribbon of candidate images for $T^{(2)}$ is illustrated at 410(2).

The interactive multi-modal image search tool receives a selection of a particular candidate image corresponding to each entity, as well as indications of re-positioning and resizing of the selected images on the canvas area 210 from which the interactive multi-modal image search tool formulates a composite visual query. Therefore, the composite visual query can be represented as a set of components $C = \{C^{(k)}\}_{k=1}^{K}$, where each component $C^{(k)}$ corresponds to one entity $T^{(k)}$, as well as the selected image $I^{(k)}$ and the position and size $R^{(k)}$ of a rectangular region including the selected image on the canvas area 210. Thus, as shown at 412, $C^{(k)}$ can be defined by a triplet $(T^{(k)}, I^{(k)}, R^{(k)})$.

Given the composite visual query including recognized entities, selected images, and their intended positions, the task is to search target images which are contextually relevant to the query. Relevance, as used herein, means that the target images are expected to represent both the entity keywords and visually similar objects in the desired positions. Thus, target images for the composite visual query 414, which is formed on a canvas such as canvas area 210, will each include a photograph or a realistic image containing a small apple above and to the right of a large bunch of bananas. The relevance between a visual query and a target image may be measured by the visual similarity and the intent consistency based on the indicated position.

The interactive multi-modal image search tool employs multiple types of visual feature analysis for image retrieval. For example, in at least one implementation the tool compares a Scale-Invariant Feature Transform (SIFT), color histogram, and gradient histogram of the composite visual query to target images for image retrieval. Since a local descriptor like SIFT may not perform well for some classes of images, the tool exploits the discriminative power of color and gradient histograms. One example class for which SIFT may not perform well includes a scene, meaning a landscape or a natural scene that does not include a landmark. Another example class for which SIFT may not perform well includes a human image, meaning a photograph or image of a random, anonymous, or unknown person or persons that does not include a celebrity. Such classes may not include SIFT shared features because of their varied appearances. However, the interactive multi-modal image search tool can employ color and/or pattern similarity within such classes for image retrieval for scene, human, and other such classes.

Example Mobile Device

Figure 5:
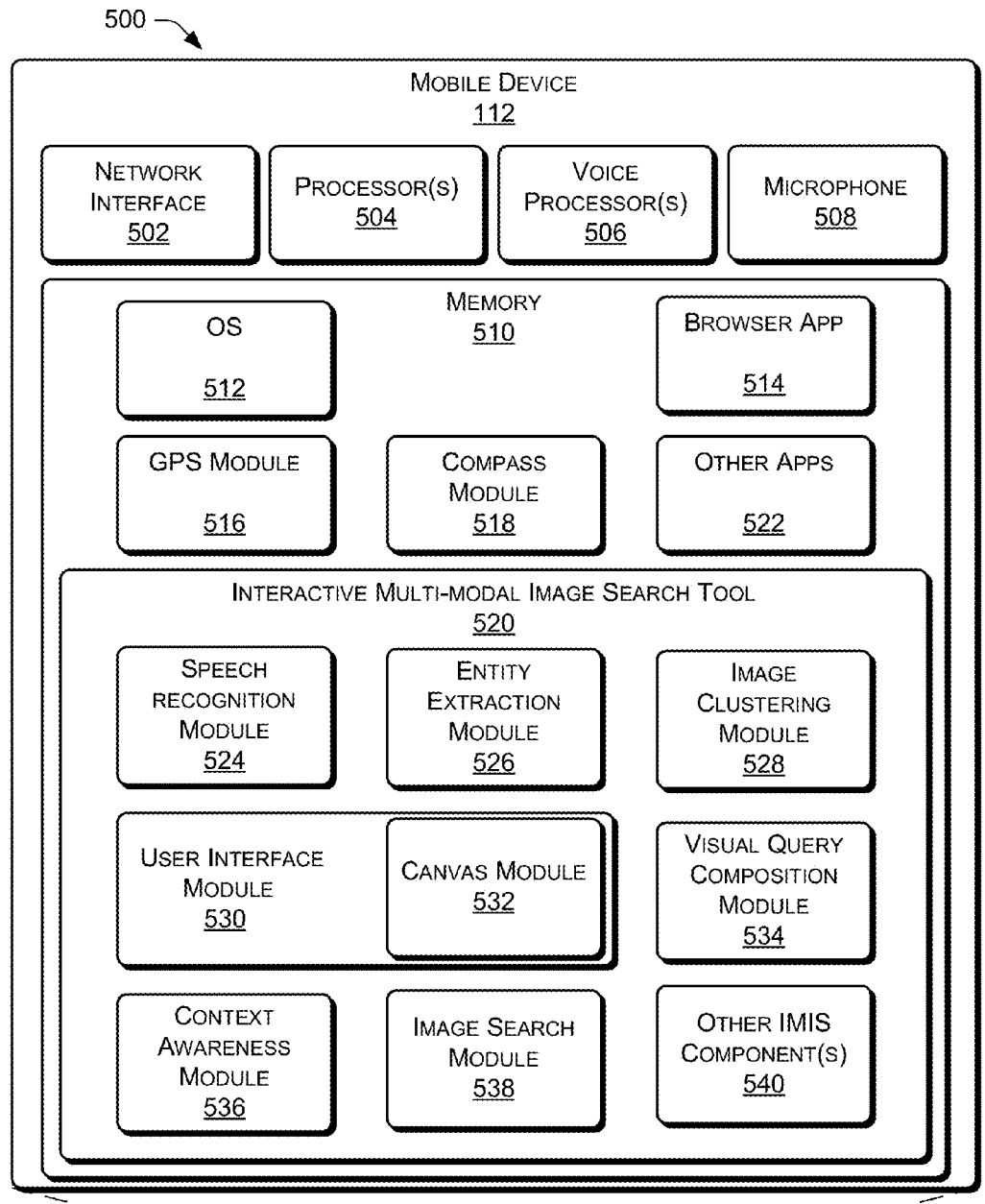
FIG. 5 is a block diagram that illustrates select components of example mobile devices configured for mobile interactive multi-modal image search.

FIG. 5 illustrates select components of an example mobile device 112 configured to provide an interactive multi-modal image search facility as described herein. Example mobile device 112 includes a network interface 502, one or more processors 504, which can include microprocessors, a voice processor 506, one or more microphones 508, and a memory 510. Network interface 502 enables mobile device 112 to send and/or receive data over a network 116. Network interface 502 may also represent any combination of other communication interfaces to enable mobile device 112 to send and/or receive various types of communication, including, but not limited to, web-based data and cellular telephone network-based data.

An operating system (OS) 512, a browser application 514, a global positioning system (GPS) module 516, a compass module 518, an interactive multi-modal image search tool 520, and any number of other applications 522 are stored in memory 510 as computer-readable instructions, and are executed, at least in part, on processor 504.

Browser application 514 represents any of a variety of applications that can be executed on mobile device 112 to provide a user interface through which web content available over the Internet may be accessed.

GPS module 516 represents any functionality implemented on mobile device 112 to determine, monitor, and/or track geographic position of the mobile device 112 according to a global positioning system. As an example, GPS module 516 may be integrated in a uni-band or multi-band transceiver. As another example, GPS module 516 may be used, at least in part, to provide maps and/or navigation directions to users of mobile device 112. As described herein, GPS module 516 may be configured to identify a current location of mobile device 112 at any given time and/or to maintain a history of locations at which mobile device 112 previously has been located.

Compass module 518 represents any functionality implemented on mobile device 112 to determine a current geographic direction of the mobile device. In an example implementation, information gleaned from compass module 518 may be combined, for example, with information gleaned from GPS module 516 to provide additional location information.

Other applications 522 may include any number of other applications that are executable on the mobile device 112. Such other applications may include, for example, an email application, a calendar application, a transactions module, a music player, a camera application, a calculator, one or more games, one or more productivity tools, an instant messaging application, an accelerometer, and so on.

Interactive multi-modal image search tool 520 includes one or more of speech recognition module 524, entity extraction module 526, image clustering module 528, user interface module 530, canvas module 532, visual query composition module 534, context awareness module 536, image search module 538, and potentially other interactive multi-modal image search components 540.

Speech recognition module 524 operates consistent with, and may make up all or a part of the programming of speech recognition engine 120. Speech recognition module 524 identifies words in audio content or input and converts the identified words to text. For example, speech recognition module 524 can be executed by voice processor 506 to process input from microphone 508. Alternatively or in addition, speech recognition module 524 may be configured to directly receive audio input, bypassing voice processor 506. Speech recognition module 524 may also access previously stored audio files and other similar data sources to generate textual representations of audio data. Speech recognition module 524 outputs a query in textual form.

Entity extraction module 526 operates consistent with, and may make up all or a part of the programming of entity extraction engine 122. Entity extraction module 526 detects nouns, specifically nouns that can be visually represented by candidate images, in the text output from the speech recognition module 524. In some embodiments, entity extraction module 526 detects visually-representable nouns from a textual query generated in one of multiple ways. For example, entity extraction module 526, which can be executed by processor 504, detects visually meaningful noun words/phrases as entities such as "house," "lake," and "tree," while discarding non-visually descriptive nouns like "law" and "holiday." In various embodiments entity extraction module 526 contributes entities to construct an entity dictionary or lexicon such as lexicon 124 by collecting nouns that have concrete visual representations.

Image clustering module 528 operates consistent with, and may make up all or a part of the programming of image clustering engine 126. Image clustering module 528 identifies candidate images, such as from image database 128, that correspond to each of the entities extracted by entity extraction module 526. For example, image clustering module 528, which can be executed by processor 504, identifies a predefined number of candidate images that can be used as respective image patches in a composite image to represent the recognized entities.

Any combination of various sources of image data may be accessed to identify image content. In an example implementation, a search service may be used to identify images or image subjects that are currently popular based on "top stories" or "top searches," which are typically maintained by Internet search services. Other context information may also be used to identify sources of image content. Any combination of techniques may be used to identify sources of image content, and any combination of such sources may be used to identify available candidate images.

User interface module 530 operates consistent with, and may make up all or a part of the programming for operation of other mechanical and/or software user interface components of the mobile device 112. For example, user interface module 530, which can be executed by processor 504, can control the functions of the a hard or soft button 202, the back button 216 and/or the start button 218 in the context of the interactive multi-modal image search tool 520. User interface module 530 enables selection of particular images of the candidate images identified by image clustering module 528. For example, user interface module 530 provides for selection of particular candidate images presented in a scrollable ribbon format on the screen of mobile device 112 as shown at 208.

Canvas module 532, which may be included as part of the programming of user interface module 530 as in the illustrated example or separate in some implementations, operates consistent with, and may make up all or a part of the programming for operation of an interactive canvas area 210 of a user interface of a touch screen of mobile device 112. For example, canvas module 532, which can be executed by processor 504, records the images selected via user interface module 530 when the selected images are placed in the canvas area 210 of the screen using a touch user interface.

Visual query composition module 534 operates consistent with, and may make up all or a part of the programming to compose a composite visual query from the selected images recorded by canvas module 532. For example, the visual query composition module 534, which can be executed by processor 504, records the location and relative size of selected images when the selected images are manipulated to form image patches of a composite visual query on the canvas area 210 of the user interface via touch interaction with the screen. In addition, visual query composition module 534 can submit the composite visual query for searching.

Context awareness module 536 operates consistent with, and may make up all or a part of the programming to perform a context-aware image search based at least on the composite visual query from visual query composition module 534. For example, context awareness module 536, which can be executed by processor 504, can ascertain a visual context of the image patches that make up the composite visual query. Context awareness module 536 can ascertain visual context based at least in part on ambiguities that are overcome by the particular candidate images selected compared to the candidate images not selected. For example, the candidate images 410(1) for the extracted entity "apple" in FIG. 4 illustrate ambiguity associated with the noun "apple." When the image of the fruit is selected, the context awareness module 536 can infer that the query is not intended to find images of electronic products made by the Apple Corporation. Context awareness module 536 makes results of the context-aware image search available to be displayed on the screen of mobile device 112.

In some instances entity extraction module 526 and/or context awareness module 536 can identify input such as "close by" or "near here" in audio input and apply location-based context information to candidate images and/or results returned from composite visual queries that may be contextually relevant based on any combination including current or anticipated future locations of mobile device 112. For example, based on contextual information obtained from GPS module 516 and compass module 518, a current location and direction of travel may be determined when a user has opted-in to the interactive multi-modal search tool collecting and using location information from GPS module 516 and/or compass module 518. Candidate images and/or composite visual query results that are related to the current location may then be identified as contextually relevant based on location information from one or more of a city being included in the query, GPS information, and/or compass information. In another example, such location information may be used to rank the visual query results that are returned.

Image search module 538 operates consistent with, and may make up all or a part of the programming to perform an image search based at least on the composite visual query from visual query composition module 534 and/or results from context awareness module 536. For example, image search module 538, which can be executed by processor 504, can identify image search results based on vector matching of one or more image patches that make up the composite visual query. Image search module 538 can make results of the image search available to be displayed on the screen of mobile device 112.

In some embodiments, other interactive multi-modal image search components 540 can apply the context of other interactive data to perform a composite visual query. For example, other context data that can be used may include, but is not limited to, recent searches, instant messaging information, data that identifies recently accessed applications (e.g., games, productivity apps, etc.), accelerometer data that can be used to determine a speed with which the mobile device 112 is moving, and so on.

Although illustrated in FIG. 5 as being stored in memory 510 of mobile device 112, in some implementations, interactive multi-modal image search tool 520, or portions thereof, can be stored on one or more servers 104 and/or executed via a cloud based implementation such as cloud 102. In addition, in some implementations, interactive multi-modal image search tool 520, or portions thereof, can be implemented using any form of computer-readable media that is accessible by mobile device 112. Furthermore, in some embodiments, one or more components of operating system 512, browser application 514, GPS module 516, interactive multi-modal image search tool 520, and/or other applications 522 may be implemented as part of an integrated circuit that is part of, or accessible to, mobile device 112. Furthermore, although illustrated and described as being implemented on a mobile device 112, in some embodiments, the data access and other functionality provided by interactive multi-modal image search tool 520 as described herein may also be implemented on any other type of computing device that is configured for multi-modal input and through which a user can perform an interactive multi-modal visual search, including, but not limited to, desktop computer systems and laptop computer systems.

Computer-readable media, as the term is used herein, includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media exclusive of any of the hardware components necessary to perform transmission.

Example Operation

FIGS. 6-9 illustrate example processes for implementing an interactive multi-modal image search tool 520 as described herein. These processes are illustrated as collections of blocks in logical flow graphs, which represent a sequence of operations that can be implemented in hardware, software, or a combination thereof. In the context of software, the blocks represent computer-executable instructions on one or more computer-readable media that, when executed by one or more processors, cause the processors to perform the recited operations.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while the processes are described with reference to the mobile device 112 described above with reference to FIGS. 1-5, in some embodiments other computer architectures including cloud-based architectures may implement one or more portions of these processes, in whole or in part.

Figure 6:
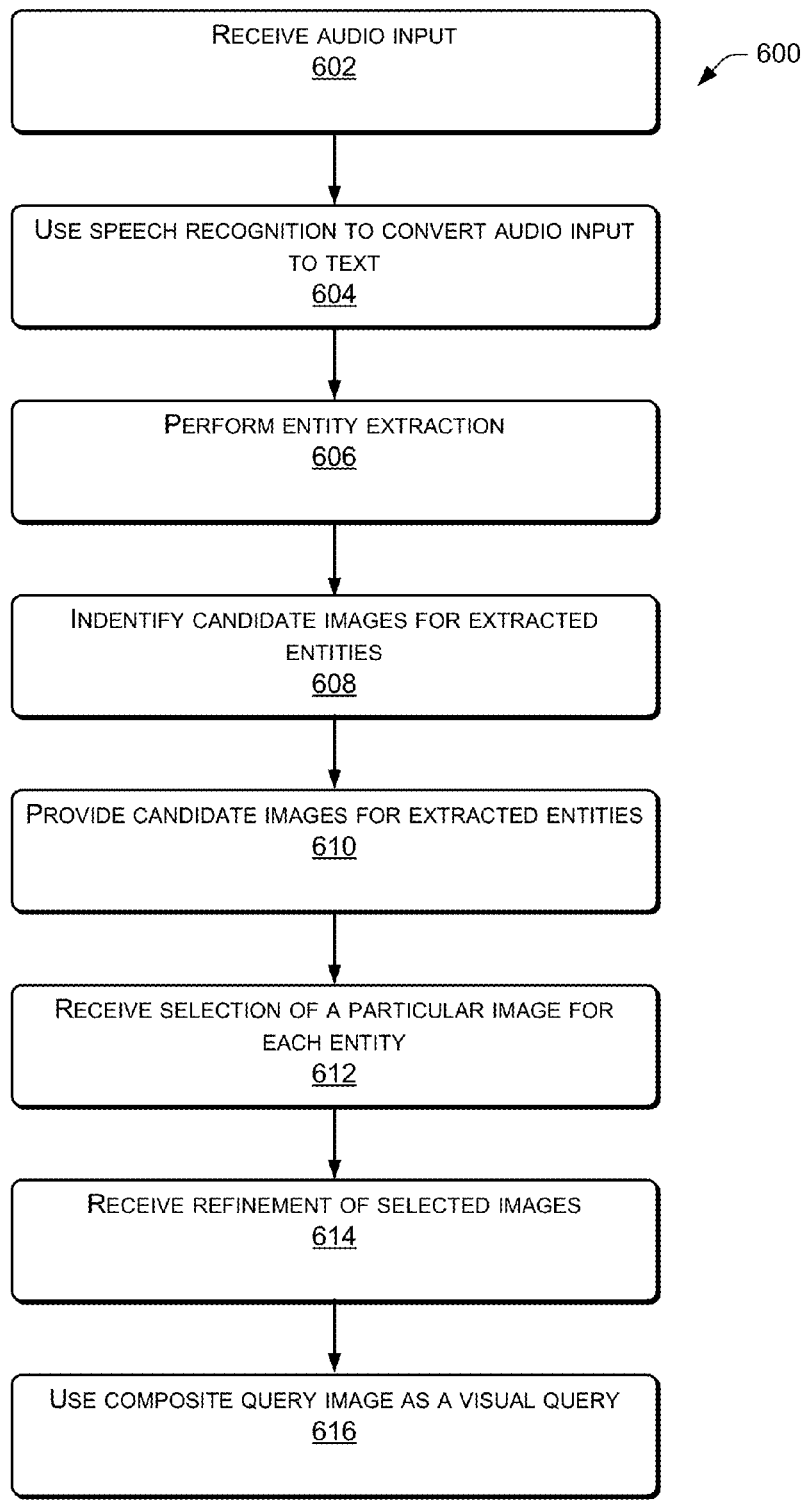
FIG. 6 is a flow diagram of an example process for implementing mobile interactive multi-modal image search.

FIG. 6 illustrates an example process 600 for implementing an interactive multi-modal image search tool.

At block 602, audio input is received. For example, as illustrated in FIGS. 1 and 5, a mobile device 112 receives a spoken query via microphone 508.

At block 604, speech recognition is used to convert the audio input to text. As described above with reference to FIGS. 1 and 5, any combination of speech recognition (SR) engines or modules, such as speech recognition engine 120 and/or speech recognition module 524, can be used to transfer the received speech to text.

At block 606, analysis is performed to identify in the text, nouns and noun phrases that can be visually represented. Each of these nouns or noun phrases is extracted as an entity in entity extraction. For example, as illustrated in FIGS. 1 and 5, any combination of entity extraction engines or modules, such as entity extraction engine 122 and/or entity extraction module 526, can be used to identify and extract from the text, nouns and noun phrases that can be visually represented.

At block 608, candidate images are identified for the extracted entities. Various sources of image content may be accessed to identify available candidate images including image databases such as image database 128 and commercial search engines. As described above, in an example implementation, a search service may be used to identify image content that is currently popular based on "top stories" or "top searches," which are typically maintained by Internet search services. In at least one implementation, a clustering-based approach based on visual features and a similarity metric is used to identify candidate images for a given entity by exploiting a known image database and results from image search engines. For example, as illustrated in FIGS. 1 and 5, any combination of image clustering engines or modules, such as image clustering engine 126 and/or image clustering module 528, can be used to identify candidate images for an entity.

At block 610, the identified candidate images are provided for selection of a particular image that most closely represents the intended meaning of the entity. As described above with reference to FIGS. 1-5, the candidate images can be provided via a touch screen enabled display such as on a mobile device 112. For example, as illustrated in FIGS. 1 and 5, any combination of user interface modules, such as user interface module 530 and/or canvas module 532, can be used to provide candidate images representing extracted entities for selection. In at least one implementation the candidate images are provided for selection via touch input to a user interface on mobile device 112.

At block 612, a selection of a particular one of the candidate images to represent each entity is received. In various embodiments the selection is received via the particular candidate image being dragged to a canvas area 210 of a user interface of mobile device 112. For example, as illustrated in FIGS. 1 and 5, any combination of user interface modules, such as user interface module 530 and/or canvas module 532, can be used to receive selection of particular candidate images representing extracted entities. In at least one implementation an indication of selection of the candidate image is received via touch input to a user interface on mobile device 112.

At block 614, refinement of the selected images is received via the canvas area 210 of the user interface. In various embodiments refinement includes information about the selected images being manipulated on the canvas area 210 to form a composite image. The manipulation comprises one or more of adjusting size, maneuvering position, and aspects of one or both of size and position of the selected images relative to one another. In at least one implementation an indication of refinement of the selected images is received via touch input to a user interface on mobile device 112.

At block 616, the composite image is used to perform a visual query in a context-aware image search.

Figure 7:
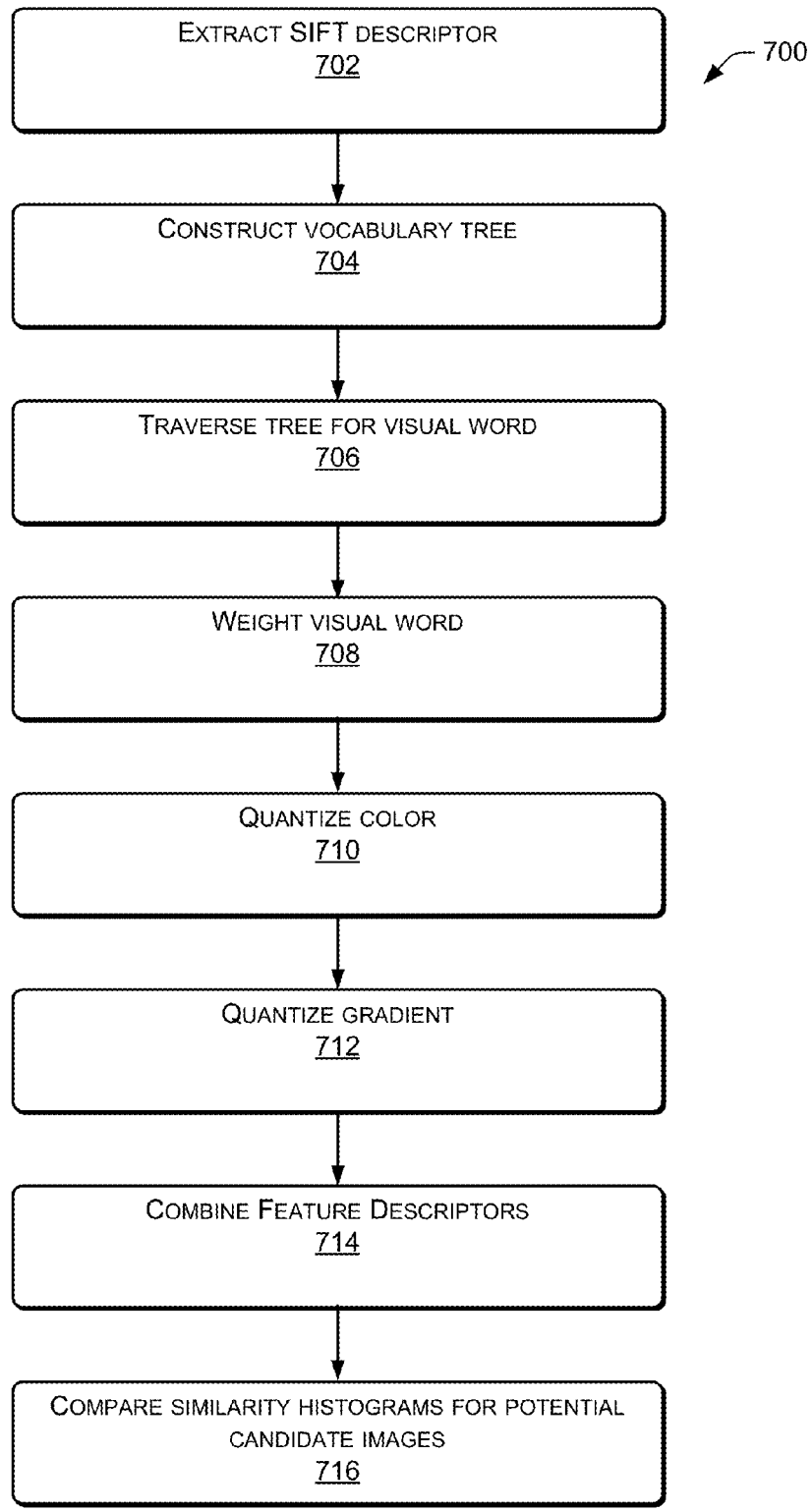
FIG. 7 is a flow diagram of an example process for comparing images described using concatenated histograms.

FIG. 7 illustrates an example process 700 for comparing images described using concatenated histograms.

In at least one implementation, at block 702 the interactive multi-modal image search tool extracts a descriptor, such as a 128-dimensional SIFT descriptor, at each key point for an image. For example, the image can include one or more of an image from image database 128, an image obtained from a web search, and/or a composite visual query image. In some instances the extraction occurs in advance offline, such as for each image from image database 128. In other instances, the extraction occurs online, in substantially real time, such as for images obtained from web searches and for composite visual query images. These online and offline extraction approaches can be combined to identify candidate images from multiple sources. For example, in at least one implementation, when a candidate image is identified for an entity based on a text search of tags of potential candidate images, feature descriptors such as SIFT, color, and/or gradient, from the identified candidate images can be matched to other images of the potential candidate images without tags or with other tags to identify additional candidate images.

In an example implementation, the judgment of whether a noun has a concrete visual representation is based on whether the noun is included in any tags of images in image database 128, which is updated regularly.

At block 704, the interactive multi-modal image search tool constructs a vocabulary tree of identified entities by hierarchical K-means. For example, the interactive multi-modal image search tool constructs a visual code book using a vocabulary tree established by hierarchical K-means. In other examples, the visual code book can be replaced by a KD-tree, or other techniques can be used. In one example implementation, this yields about 6,000 visual words from an image database, such as for each image from image database 128. In various examples, leaves of a vocabulary tree can be deemed visual words, and a local point within an image can be matched to leaves of the vocabulary tree to find the leaf most similar to the image.

At block 706, the interactive multi-modal image search tool hashes each SIFT descriptor into a visual word by traversing the tree.

At block 708, the interactive multi-modal image search tool describes an image by weighting the visual words. For example, in one implementation, the interactive multi-modal image search tool weights visual words based on relative distance of their respective image patches from the center of the image, with image patches that are closer to the center being more heavily weighted than those that are farther from the center. As another example, in at least one implementation, the interactive multi-modal image search tool weights visual words based on relative size of their respective image patches, with image patches that are larger being more heavily weighted.

At block 710, the interactive multi-modal image search tool quantizes color from the image. For example, in one example implementation the interactive multi-modal image search tool quantizes the color from the image into 192 bins in the hue, saturation, and value (HSV) space to describe the image.

At block 712, the interactive multi-modal image search tool quantizes a gradient from the image. For example, the interactive multi-modal image search tool quantizes the gradient from the image into eight directions and eight intensities, yielding a 64-dimensional gradient histogram to describe the image.

At block 714, the interactive multi-modal image search tool combines the feature descriptors to describe the image. In various implementations the feature descriptors can be combined via linear fusion, concatenation, or other forms of combining. Thus, for the example implementation, as a result, the tool describes the image by a concatenated histogram of these three types of visual features, e.g., (6256=6000 visual words+ 192 color bins+64 dimension gradient histogram). Employing these three types of visual features has been proven to be effective for image retrieval. In at least one implementation each kind of feature is normalized individually before being combined. The interactive multi-modal image search tool also uses a weighting function to balance different types of descriptors and to mine informative elements in histograms in some implementations.

At block 716, the interactive multi-modal image search tool uses a similarity metric to compare similarity of the histograms for potential candidate images. For example, let $f_i$ and $f_j$ denote the normalized histograms of images i and j, respectively. The similarity between these two images is given by a weighted intersection kernel between the two histograms as represented by equation 1.

$$sim(f_i, f_j) = \sum_{n=1}^{N} w_n \min(f_{i,n}, f_{j,n}) \qquad (1)$$

In equation 1, $f_{i,n}$ indicates the n-th element of histogram $f_i$, $w_n$ is the weight for measuring the contribution from the similarity on the n-th element, and N (e.g., N=6256) is the dimension of the histogram. Since not all of the elements in the histogram are equally important for comparing images, the weight differentiates the contributions from different features. The interactive multi-modal image search tool averages features across the images and obtains an average histogram $\bar{f} = \{\bar{f}_n\}_{n=1}^{N}$, and then defines the weight $w_n$ as $w_n = 1/\bar{f}_n$. The more frequent the element across all images, the less important the element is. Accordingly this weighting function is able to mine informative elements in the histogram and balance different types of descriptors.

Figure 8:
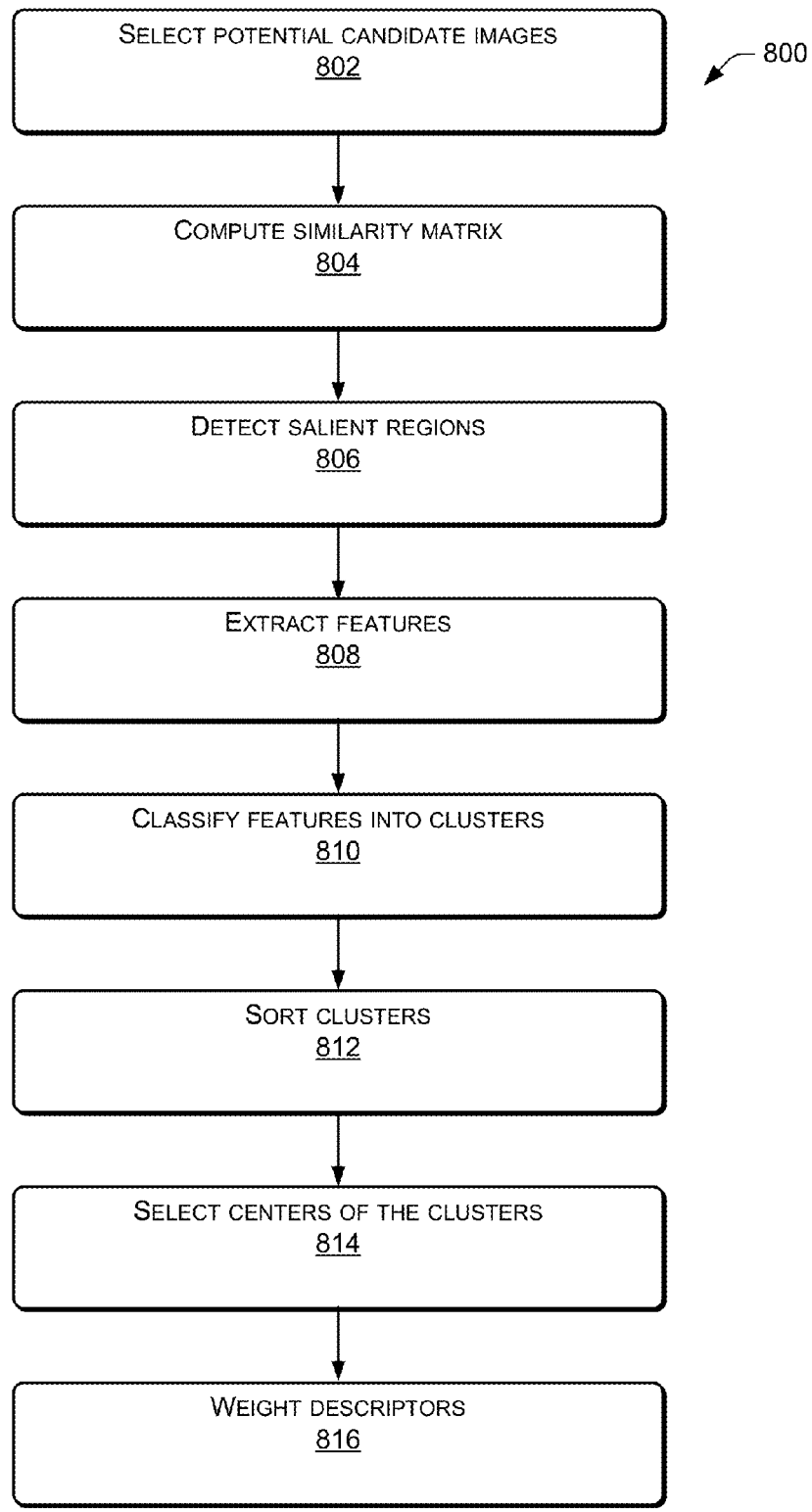
FIG. 8 is a flow diagram that illustrates an example clustering-based process for generating candidate images.

FIG. 8 illustrates an example process 800 of a clustering-based approach employed by the interactive multi-modal image search tool to identify the candidate images for each entity. In some implementations, process 800 represents candidate images being identified for extracted entities in accordance with block 608 of FIG. 6.

At block 802, the interactive multi-modal image search tool selects potential candidate images from an image database and a predetermined number of top images from a commercial image search engine, (e.g., 1,000), according to the entity keywords.

At block 804, the interactive multi-modal image search tool computes a similarity matrix by comparing pairs of images based on the visual descriptors and similarity metric described in the previous sections and shown by equation 1.

At block 806, in some implementations, to avoid background clutter, the interactive multi-modal image search tool conducts a salient region detection process before feature extraction. For example, when an image containing an object is cluttered so that the object is not readily discernible, the interactive multi-modal image search tool can employ a salient region detection process to obtain the image components that reflect the object without the additional background components cluttering the image.

At block 808, the interactive multi-modal image search tool extracts features from the images. In at least one embodiment, to avoid background clutter, only the visual descriptors within the salient regions are considered.

At block 810, in various embodiments, the interactive multi-modal image search tool uses an unsupervised clustering method that groups features into a number of classes. For example, an affinity propagation (AP) algorithm is an unsupervised clustering method used to find the visual instances of features for grouping into classes.

At block 812, the interactive multi-modal image search tool sorts the clusters in descending order according to the number of images included in each cluster. For example, a cluster with less than 100 images would be ranked lower than a cluster with more than 100 images.

At block 814, the interactive multi-modal image search tool selects the centers of a predetermined number of images from the top clusters (e.g., the top 10) as candidate images for this entity. For example, potential candidate images showing different subjects may have tags that match an entity. While the potential candidate images may be collected by searching for a certain tag, the interactive multi-modal image search tool can cluster these potential candidate images into groups according to their appearance to identify representative images of the different subjects presented in the images. The interactive multi-modal image search tool can rank the groups, for example, according to the number of images in the respective groups, such that the group with the largest number of images is ranked first. In addition, in some instances, the interactive multi-modal image search tool retains a predetermined number, e.g., the top ten or the top five, groups deemed most representative. In some instances the number of groups retained is user configurable.

At block 814, for the retained groups, the interactive multi-modal image search tool selects the cluster center of each group as the representative candidate image, one image from each cluster. Thus, for example, a representative image from each of ten groups representing ten different subjects that have tags corresponding to the entity can be presented as ten candidate images from which an image can be selected to become a part of a composite visual query.

At block 816, the interactive multi-modal image search tool weights the descriptors. For example, a Gaussian window may be used to weight the descriptors and to make the descriptors close to the centers more important.

Figure 9:
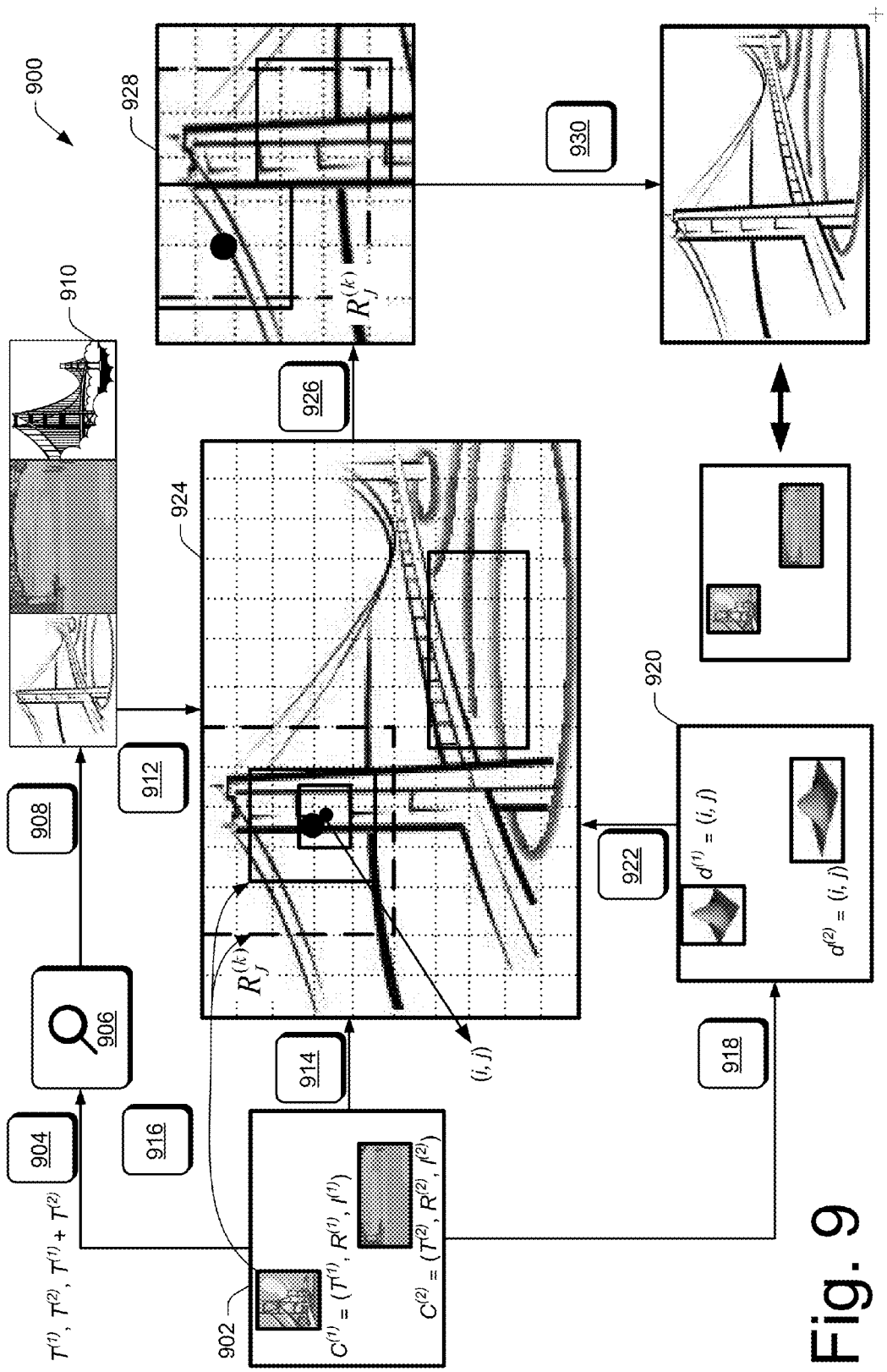
FIG. 9 is a flow diagram that illustrates a mathematically annotated view of a context-aware composite-image-based image search process.

FIG. 9, at 900, illustrates a mathematically annotated view of a context-aware composite-image-based image search process. The process begins with a composite visual query C, as shown at 902, which includes two image patches.

At 904, the interactive multi-modal image search tool generates a textual query, for example, by combining the stored tags representing entity keywords $\{T^{(k)}\}$ as discussed regarding FIG. 4. As another example, the textual query can be generated to include text from other categories than tags, such as city names from a location category when the city name is not included in a tag. The generated textual query is submitted to any combination of image search modules or engines, such as those illustrated in FIGS. 5 and 9, including image search module 538 and/or image search engine 906.

At 908, the image search engine 906 searches related images from an image database such as image database 128 according to the textual query. In some instances, the related images are filtered according to location, which can include one or more of GPS information, location category, and/or city tags, when these are available to reduce the number of search results. Search results 910 are candidate images. Candidate images 910 represent candidate images from the entities extracted from the textual query 904 and represented by the composite visual query 902. These candidate images 910 are text-based image search results that can each be compared as target images to the composite visual query 902.

At 912, the interactive multi-modal image search tool computes a visual similarity $\{e_j^{(k)}(i,j)\}$ between each image patch component of the composite visual query and a corresponding region in the target image J, 924.

Regarding act 912, to compute the region-based visual similarity, $e_j^{(k)}(i,j)$, between an image patch component in the composite visual query, 902, and the corresponding region in the target image J, 924, the interactive multi-modal image search tool obtains a visual representation of the corresponding region in J, 924. As it is not always practical to compute the visual representation of a specific region in J, 924, in real-time (for example, because users may frequently change the position and size of this component while building the composite image), the interactive multi-modal image search tool employs an efficient grid-based search scheme and partitions the target image J into small grids $\{(i,j)\}_{i,j=1}^{M}$. Where M represents an integer number of cells into which the target image J will be partitioned and i,j represent the coordinates of a corner point for each cell.

For the k-th image patch component (corresponding to the region $R^{(k)}$ in the composite query), and its center position corresponding to the grid (i,j) in J, then the corresponding region $R_J^{(k)}$ in J is given by the union of each of the associated grids, i.e., $R_J^{(k)} \cup_{(i,j) \in R^{(k)}}(i,j)$. In each grid, the interactive multi-modal image search tool obtains the feature histogram using the approach employing the three types of visual features including SIFT, color histogram, and gradient histogram discussed above. In an example implementation the obtained feature histogram is saved in advance. The interactive multi-modal image search tool can represent the target image J as $\{h_J(i,j)\}_{i,j=1}^{M}$, where $h_J(i,j)$ is the visual descriptor for the grid (i,j). M=9, (a 9×9 grid), is used in one example implementation. The interactive multi-modal image search tool obtains the visual representation of region $R_J^{(k)}$ using the linear fusion of histograms from the related grids as represented by equation 2.

$$f_J^{(k)}(i,j) = \sum_{(i,j) \in R_J^{(k)}} w_J(i,j) h_J(i,j), \qquad (2)$$

In equation 2, $w_J(i,j)$ is a 2D Gaussian distributed weight centered at the given region, which assigns more importance to the grids close to the center. Then, the region-based visual similarity between the k-th image patch component and the region $R_J^{(k)}$ is given by equation 3.

$$e_J^{(k)}(i,j) = sim(f^{(k)}, f_J^{(k)}(i,j)), \qquad (3)$$

In equation 3, $f^{(k)}$ is the visual descriptor of the k-th image patch component, while sim(•) is given in equation (1). Note that in the above equation, the interactive multi-modal image search tool uses both the index of (i,j) and k. This is because the interactive multi-modal image search tool will use a sliding window to compute the region-based similarity to deal with the tolerance of position. Therefore, $e_J^{(k)}(i,j)$ indicates the visual similarity between the k-th image patch component and the corresponding region centered at (i,j) in the target image J.

At 914, the interactive multi-modal image search tool overlays the dimensions of each image patch component from composite visual query 902 onto target image J.

At 916, as shown by the double-headed arrow from image patch component $C^{(1)}$, the interactive multi-modal image search tool expands an area of the patch to a larger size on target image J to account for input imprecision.

At 918, the interactive multi-modal image search tool generates an intent map $\{d^{(k)}(i,j)\}$ as shown at 920. The intent map 920 is generated according to the positions of the image patch components within the composite virtual query 902, as refined on a canvas such as canvas area 210. For example, in various embodiments refinement may change the size and/or position of one or more of the selected images as discussed above regarding block 614 of FIG. 6.

Regarding act 918, the computation of the region-based relevance between the image patch component $I^{(k)}$ and the corresponding region $R_J^{(k)}$ should take the intent into account. Such region-based intent relevance can be noted as relevance $r_J^{(k)}$. Intuitively, intent close to the center of each region $R^{(k)}$ is stronger than an intent farther away from the center. Moreover, intent within the image patch component $I^{(k)}$ is stronger than intent outside of it. The interactive multi-modal image search tool first defines an intent map which is a soft measurement of intent in the composite visual query.

Let $(x^{(k)}, y^{(k)})$ denote the center of the k-th image patch component in the composite visual query. To tolerate the uncertainty of this position as specified by the user, the interactive multi-modal image search tool computes a soft map to represent the intent as represented by equation 4.

$$d(x,y) = 2g(x,y) - 1, \qquad (4)$$
$$g(x,y) = \exp\left\{-\left(\frac{x - x^{(k)}}{\theta \cdot w^{(k)}}\right)^2 - \left(\frac{y - y^{(k)}}{\theta \cdot h^{(k)}}\right)^2\right\},$$

In equation 4, $w^{(k)}$ and $h^{(k)}$ are the width and height of region $R^{(k)}$, respectively, and θ is set to a constant such as $(8 \ln 2)^{-1/2}$ to make g degrade to 0.5 at the border of region $R^{(k)}$. Other values may be used.

Regarding act 922, the interactive multi-modal image search tool determines intent consistency for grids within and outside $R_J^{(k)}$. The intent consistency in terms of a k-th component at grid (i,j) is given by equation 5.

$$r_J^{(k)+}(i,j) = \min(e_J^{(k)}(i,j), d^{(k)}(i,j)) \qquad (5)$$

This is called positive relevance as it mainly focuses on the grids within $R_J^{(k)}$. The interactive multi-modal image search tool also employs a scheme to penalize an entity existing in an undesired position (e.g., out of the indicated region). The interactive multi-modal image search tool represents the relevance of each grid outside the region with a penalty score. The penalty score can be obtained by equation 6.

$$r_J^{(k)-}(i,j) = \min(e_J^{(k)}(i,j), -d^{(k)}(i,j)) \qquad (6)$$

This is called negative relevance as it penalizes the grids outside $R_J^{(k)}$. This allows for imprecision in the indication of intent from the placement and refinement of selected images on the composite query canvas (e.g., the selected image may be positioned in an approximate position rather than an exact position, and not well resized). Therefore, the interactive multi-modal image search tool maintains tolerance to the position and the size of each image patch component.

At 922, the interactive multi-modal image search tool computes a positive relevance, $r_J^{(k)+}(i,j)$, and a negative relevance, $r_J^{(k)-}(i,j)$, for each image patch component by considering both visual similarity and the generated intent map for image patches in target image J 924, that correspond to each image patch component in the composite query image.

At 926, the interactive multi-modal image search tool computes a combined relevance, $r_J^{(k)}$, for each image patch component by considering surrounding grids in target image J, 924, (using a sliding window) as shown at 928.

Regarding act 926, to deal with the tolerance issue, the interactive multi-modal image search tool uses a sliding window, for which the size is the same as $R^{(k)}$ and places this window centered at all the grids (i,j) in $R_J^{(k)}$. In other words, the original image patch component is re-positioned on these sliding windows to introduce some position tolerance. The interactive multi-modal image search tool is always searching for the best match among these sliding windows, as shown in FIG. 9. As a result, the "positive relevance" and "negative relevance" between the k-th image patch component and $R_J^{(k)}$ is computed by equation 7.

$$r_J^{(k)+} = \max_{(i,j) \in R_J^{(k)}} \{r_J^{(k)+}(i,j)\}, \quad (7)$$

$$r_J^{(k)-} = \max_{(i,j) \notin R_J^{(k)}} \{r_J^{(k)-}(i,j)\}.$$

The combined relevance between the k-th image patch component and $R_J^{(k)}$ is given by equation 8.

$$r_J^{(k)} = r_J^{(k)+} - r_J^{(k)-} \quad (8)$$

At 930, the interactive multi-modal image search tool computes an overall relevance, $r_J$, between the composite visual query C, 902, and the target image J, 924. In this way, the interactive multi-modal image search tool can rank the images returned at 908 according to the overall relevance scores.

Regarding act 930, after the interactive multi-modal image search tool obtains each region-based relevance $r_J^{(k)}$, the interactive multi-modal image search tool computes an overall relevance between C and J by comparing a concatenation of visual descriptors across all the image patch components of both C and J. To consider the variance of different image patch components, the overall relevance is given by a fusion function sensitive to both the mean and the variance of each region-based relevance as shown in equation 9.

$$r_J = E(r_J^{(k)}) - \frac{\gamma}{K} \sum_{k=1}^{K} |r_J^{(k)} - E(r_J^{(k)})| \quad (9)$$

In equation 9, $$E(r_J^{(k)}) = \frac{1}{K} \sum_k r_J^{(k)}$$

is the average relevance, and γ is a positive parameter controlling a degree of penalization. Such a penalty can be employed when there are no closer target images to some of the regions or when some regions are well matched while some are poorly matched. Accordingly, in some implementations, at least in part, the degree of penalization imposed is based on an amount of discrepancy ascertained for relevance matching of various regions. In at least one implementation, the degree of penalization is empirically set to 0.8.

CONCLUSION

With the ever-increasing functionality and data access available through mobile devices, such devices can serve as personal Internet-surfing concierges that provide users with access to ever increasing amounts of data while on the go. By leveraging the multi-modal interactions made available by a mobile device, an interactive multi-modal image search tool can effectively perform visual searching without the need of an existing query image.

Although an interactive multi-modal visual search system has been described in language specific to structural features and/or methodological operations, it is to be understood that the features and operations defined in the appended claims is not necessarily limited to the specific features or operations described. Rather, the specific features and operations are disclosed as example forms of implementing the claims.

What is claimed is:

1. A method comprising:
   receiving a query input via a computing device, the query including at least a first textual entity and a second textual entity;
   generating a candidate set of images based at least in part on the query input, the candidate set of images including at least a first set of images associated with the first textual entity and a second set of images associated with the second textual entity;
   receiving a first selection of a first image from the first set of images;
   receiving a first indication of placement of the first image on a canvas via a user interface of the computing device;
   receiving a second selection of a second image from the second set of images;
   receiving a second indication of placement of the second image on the canvas via the user interface;
   creating, based at least in part on the canvas, a query image for performing a visual search, the query image including a first image patch and a second image patch, the first image patch corresponding to the first image and the second image patch corresponding to the second image, wherein the relative positions of the first image patch and the second image patch within the query image are based at least in part on relative positions of the first image and the second image on the canvas; and
   performing the visual search using the query image.

2. A method as recited in claim 1, further comprising extracting the first textual entity and the second textual entity from the query input.

3. A method as recited in claim 1, wherein relative sizes of the first image patch and the second image patch within the query image are based at least in part on relative sizes of the first image and the second image on the canvas.

4. A method as recited in claim 1, the query input comprising an audio input.

5. A method as recited in claim 1, the user interface comprising a touch interface.

6. A method as recited in claim 1, further comprising recording the query image in memory.

7. A method as recited in claim 1, further comprising:
   receiving an input, the input indicating a revision of a size of at least one of the first image or the second image on the canvas.

8. A method as recited in claim 1, wherein performing a visual search using the query image comprises assigning a first relative weight to the first image patch and a second relative weight to the second image patch.

9. A method as recited in claim 8, wherein:
the first image patch is located closer to a center of the query image than the second image patch; and
assigning the first relative weight and the second relative weight comprises assigning a heavier weight to the first image patch located closer to the center of the query image relative to the second image patch located further from the center of the query image.

10. A method as recited in claim 1, wherein performing the visual search using the query image comprises:
identifying a target image using the query image;
determining a first visual similarity between the first image patch and first a corresponding region on the target image; and
determining a second visual similarity between the second image patch and a second corresponding region on the target image.

11. A method as recited in claim 10, wherein performing the visual search using the query image further comprises:
determining a first relevance for the first image patch based at least in on the first visual similarity;
determining a second relevance for the second image patch based at least in part on the second visual similarity; and
determining an overall relevance between the query image and the target image based at least in part on the first relevance and the second relevance.

12. A method as recited in claim 11, further comprises:
determining an additional overall relevance between the query image and an additional target image; and
ranking the target image and the additional target image based at least in part on the overall relevance and the additional overall relevance.

13. A computing device comprising:
a processor;
a memory communicatively coupled to the processor;
a user interface configured to:
receive a query input, the query input including at least a first textual entity and a second textual entity;
generate a candidate set of images based at least in part on the query input, the candidate set of image including at least a first image associated with the first textual entity and a second image associated with the second textual entity;
receive an indication of placement of the first image and the second image to form a composite visual query such that:
individual image patches of the composite visual query correspond to at least one of the first image or the second image; and
relative locations of the image patches within the composite visual query correspond to placement locations of the first image and the second image on a canvas portion of the user interface; and
an interactive image search tool configured to perform a visual search using the composite visual query.

14. A computing device as recited in claim 13, wherein the indication of the placement includes an indication of a size of at least one of the first image or the second image on the canvas portion of the user interface.

15. A computing device as recited in claim 14, wherein the indication of the size includes a revision of a size of the first image on the canvas portion of the user interface relative to a size of the second image on the canvas portion of the user interface.

16. A computing device as recited in claim 13, the computing device comprising a mobile device.

17. A computing device as recited in claim 13, the user interface comprising a touch interface.

18. One or more computer storage media having computer-executable instructions recorded thereon, the computer-executable instructions upon execution by a processor programming the processor to cause one or more computing devices to perform operations comprising:
receiving a query input via a computing device, the query including at least a first entity and a second entity;
generating a candidate set of images based at least in part query input, the candidate set of images including at least a first set of two or more images associated with a first entity extracted from the text and a second set of two or more images associated with a second entity extracted from the text;
causing the first set of two or more images to be displayed;
receiving a selection of a first image from the first set of two or more images;
receiving an indication of placement of the first image on a canvas via a user interface of the computing device;
causing the second set of two or more images to be displayed;
receiving a selection of a second image from the second set of two or more images;
receiving an indication of a placement of the second image on the canvas via the user interface; and
generating, based at least in part on the canvas, a composite query image for performing a visual search, the composite query image including a first image patch corresponding to the first image and a second image patch corresponding to the second image, wherein relative positions of the first image patch and the second image patch within the composite query image are based at least in part on relative positions of the first image and the second image on the canvas; and
performing the visual search using the composite query image.

19. One or more computer storage media as recited in claim 18, wherein the indication of the placement of the first image includes a location of the placement of the first image on the canvas.

20. One or more computer storage media as recited in claim 18, the operations further comprising submitting the composite query image for the visual search.

* * * * *